(12) United States Patent
Sun

(10) Patent No.: US 10,133,034 B2
(45) Date of Patent: Nov. 20, 2018

(54) PROJECTION LENS ASSEMBLY

(71) Applicants: Sintai Optical (Shenzhen) Co., Ltd., ShenZhen, Guangdong Province (CN); Asia Optical Co., Inc., Taichung (TW)

(72) Inventor: Chia-Hung Sun, Taichung (TW)

(73) Assignees: SINTAI OPTICAL (SHENZHEN) CO., LTD., Shenzhen, Guandong Province (CN); ASIA OPTICAL CO., INC., Taichung (TW)

( * ) Notice: Subject to any disclaimer, the term of this patent is extended or adjusted under 35 U.S.C. 154(b) by 6 days.

(21) Appl. No.: 15/602,217

(22) Filed: May 23, 2017

(65) Prior Publication Data

US 2017/0343772 A1   Nov. 30, 2017

(30) Foreign Application Priority Data

May 26, 2016   (CN) .......................... 2016 1 0363322

(51) Int. Cl.
  *G02B 13/18*   (2006.01)
  *G02B 3/02*   (2006.01)
  *G02B 13/00*   (2006.01)
  *G02B 9/60*   (2006.01)

(52) U.S. Cl.
  CPC ........... *G02B 13/0045* (2013.01); *G02B 9/60* (2013.01); *G02B 13/0055* (2013.01)

(58) Field of Classification Search
  CPC ... G02B 13/0045; G02B 9/60; G02B 13/0055
  See application file for complete search history.

(56) References Cited

U.S. PATENT DOCUMENTS

| | | | | |
|---|---|---|---|---|
| 9,557,537 | B2 * | 1/2017 | Nagahara | ............... G02B 13/16 |
| 2013/0088789 | A1 * | 4/2013 | Yanagisawa | ....... G02B 13/0045 359/715 |

* cited by examiner

*Primary Examiner* — Alicia M Harrington
(74) *Attorney, Agent, or Firm* — McClure, Qualey & Rodack, LLP

(57) ABSTRACT

A projection lens assembly includes a first lens group, a second lens group, a third lens group and a fourth lens group, all of which are arranged in order from a projection side to an image source side along an optical axis. The first lens group is with negative refractive power. The second lens group is with positive refractive power and includes a projection side surface and an image source side surface, wherein both of the projection side surface and the image source side surface are convex surfaces. The third lens group includes a convex surface facing the projection side. The fourth lens group is with positive refractive power and includes a convex surface facing the image source side. The projection lens assembly satisfies: $1.4<F<3.5$, wherein F is an F-number of the projection lens assembly.

20 Claims, 23 Drawing Sheets

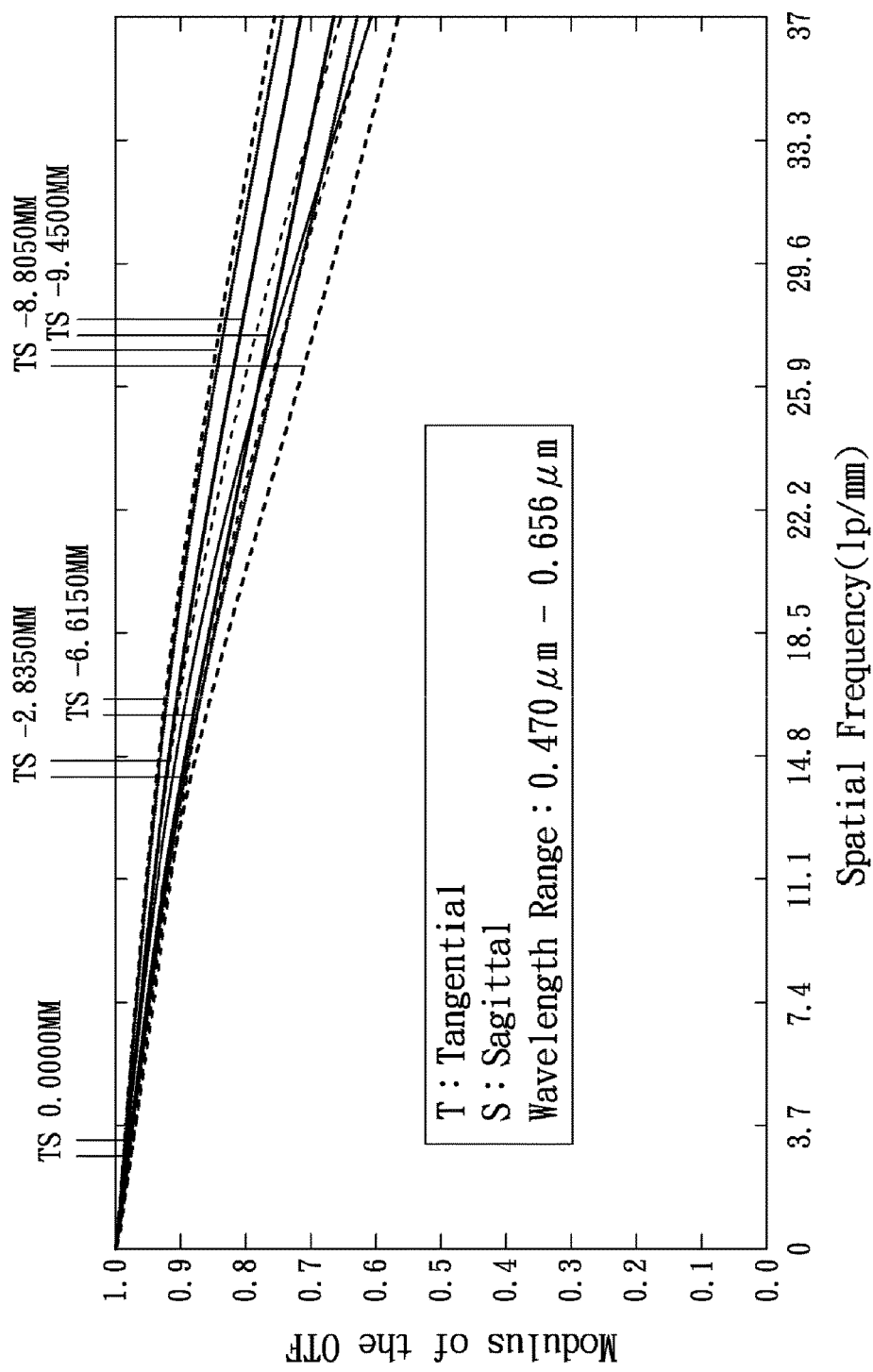

PROJECTION LENS ASSEMBLY

BACKGROUND OF THE INVENTION

Field of the Invention

The invention relates to a projection lens assembly.

Description of the Related Art

The current development trend of a projection lens assembly is toward miniaturization. Additionally, the projection lens assembly is developed to have high resolution capability, have large aperture to enhance the projector's output lumens, and is able to resist the change of environment temperature in accordance with different application requirements. However, the known projection lens assembly can't satisfy such requirements. Therefore, a projection lens assembly needs a new structure in order to meet the requirements of miniaturization, high resolution, large aperture and resistance to environment temperature change at the same time.

BRIEF SUMMARY OF THE INVENTION

The invention provides a projection lens assembly to solve the above problems. The projection lens assembly of the invention is provided with characteristics of a smaller volume, an increased resolution, a decreased F-number and a resistance to environment temperature change, still has a good optical performance.

The projection lens assembly in accordance with the invention includes a first lens group, a second lens group, a third lens group and a fourth lens group, all of which are arranged in order from a projection side to an image source side along an optical axis. The first lens group is with negative refractive power. The second lens group is with positive refractive power and includes a projection side surface and an image source side surface, wherein both of the projection side surface and the image source side surface are convex surfaces. The third lens group includes a convex surface facing the projection side. The fourth lens group is with positive refractive power and includes a convex surface facing the image source side. The projection lens assembly satisfies: $1.4<F<3.5$, wherein F is an F-number of the projection lens assembly.

The first lens group includes a first lens with negative refractive power, the second lens group includes a second lens with positive refractive power, the third lens group includes a third lens with negative refractive power and a fourth lens with positive refractive power, both of which are arranged in order from the projection side to the image source side along the optical axis, and the fourth lens group includes a fifth lens with positive refractive power.

The projection lens assembly satisfies: $0.6<R_{12}/f<1.5$, wherein $R_{12}$ is a radius of curvature of an image source side surface of the first lens and f is an effective focal length of the projection lens assembly.

The first lens is an aspheric lens and satisfies: $Vd_1>40$, wherein $Vd_1$ is an Abbe number of the first lens.

The fifth lens is an aspheric lens.

The second lens, the third lens and the fourth lens are spherical lenses, and satisfy: $Nd_2>1.6$, $Nd_3>1.6$, $Nd_4>1.6$, $Vd_3<35$, wherein $Nd_2$ is an index of refraction of the second lens, $Nd_3$ is an index of refraction of the third lens, $Nd_4$ is an index of refraction of the fourth lens and $Vd_3$ is an Abbe number of the third lens.

The projection lens assembly further includes a stop disposed between the second lens and the fourth lens, wherein the third lens and the fourth lens are cemented together to form a cemented lens.

The projection lens assembly satisfies: $0.6<R_{12}/f<1.2$, wherein $R_{12}$ is a radius of curvature of an image source side surface of the first lens and f is an effective focal length of the projection lens assembly.

The projection lens assembly satisfies: $1.4<F<2.5$, wherein F is an F-number of the projection lens assembly.

The first lens group includes a first lens with negative refractive power, the second lens group includes a second lens with positive refractive power, the third lens group is with negative refractive power and includes a third lens and a fourth lens, both of which are arranged in order from the projection side to the image source side along the optical axis, the fourth lens group includes a fifth lens with positive refractive power, and lens group intervals among the first lens group, the second lens group, the third lens group, and the fourth lens group along the optical axis are adjustable to change an effective focal length of the projection lens assembly.

The projection lens assembly satisfies: $f_T/f_W>1$, wherein $f_T$ is an effective focal length of the projection lens assembly at a telephoto end and $f_W$ is an effective focal length of the projection lens assembly at a wide-angle end.

The first lens is an aspheric lens, the second lens, the third lens and the fourth lens are spherical lenses, and satisfy: $Nd_2>1.6$, $Nd_3>1.6$, $Nd_4>1.6$, $Vd_1>40$, $Vd_3<35$, wherein $Nd_2$ is an index of refraction of the second lens, $Nd_3$ is an index of refraction of the third lens, $Nd_4$ is an index of refraction of the fourth lens, $Vd_1$ is an Abbe number of the first lens and $Vd_3$ is an Abbe number of the third lens.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 4C is a modulation transfer function diagram of the projection lens assembly in accordance with the second embodiment of the invention;

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
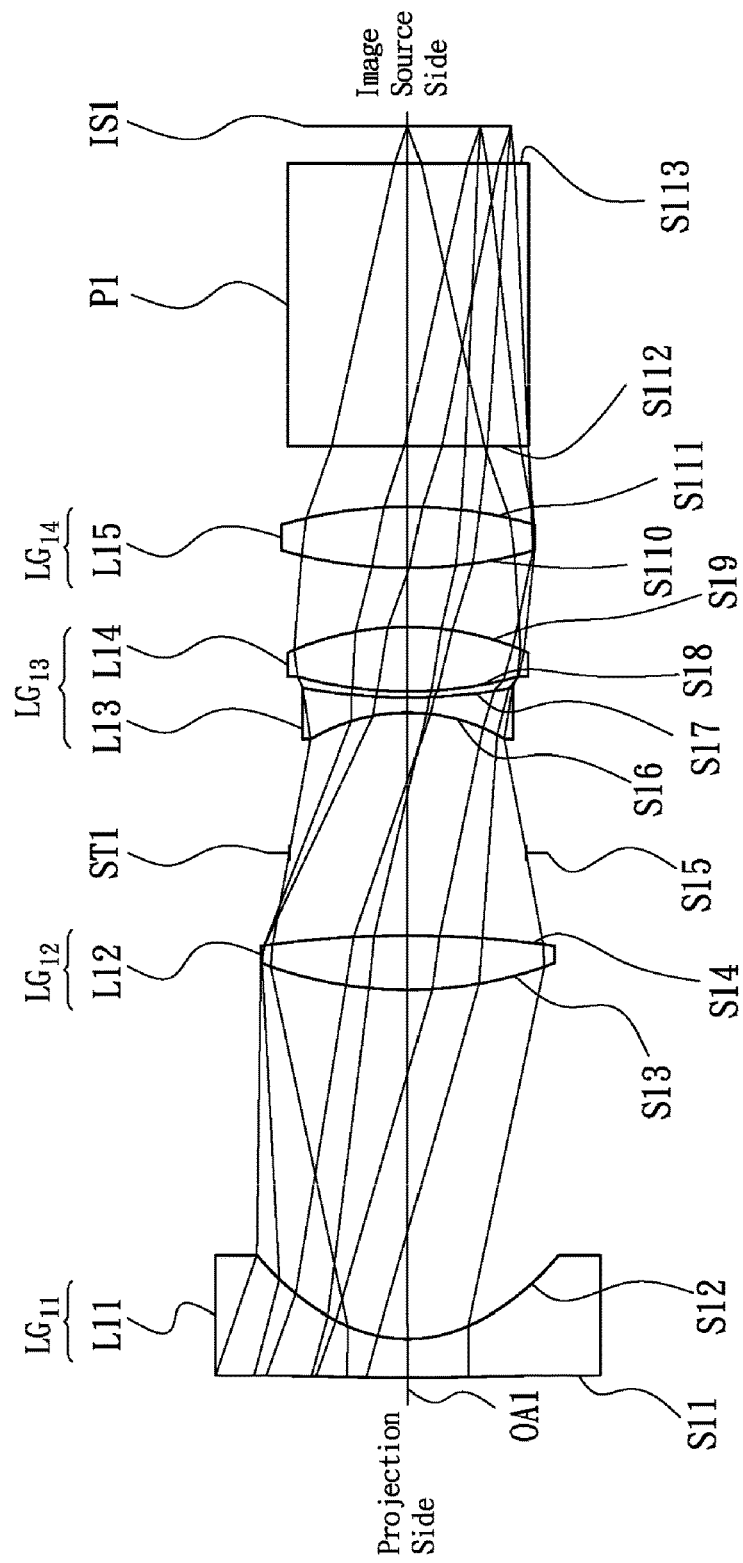
FIG. 1 is a lens layout and optical path diagram of a projection lens assembly in accordance with a first embodiment of the invention.

Referring to FIG. 1, FIG. 1 is a lens layout and optical path diagram of a projection lens assembly in accordance with a first embodiment of the invention. The projection lens assembly 1 includes a first lens group $LG_{11}$, a second lens group $LG_{12}$, a stop ST1, a third lens group $LG_{13}$, a fourth lens group $LG_{14}$ and a prism P1, all of which are arranged in order from a projection side to an image source side along an optical axis OA1. In operation, light rays from an image source IS1 are projected on the projection side. The first lens group $LG_{11}$ is with negative refractive power and includes a first lens L11, wherein the first lens L11 is a meniscus lens with negative refractive power, made of glass material, and the projection side surface S11 is a convex surface, the image source side surface S12 is a concave surface and both of the projection side surface S11 and image source side surface S12 are aspheric surfaces. The second lens group $LG_{12}$ is with positive refractive power and includes a second lens L12, wherein the second lens L12 is a biconvex lens with positive refractive power, made of glass material, and the projection side surface S13 is a convex surface, the image source side surface S14 is a convex surface and both of the projection side surface S13 and image source side surface S14 are spherical surfaces. The third lens group $LG_{13}$ includes a third lens L13 and a fourth lens L14, wherein the third lens L13 is a biconcave lens with negative refractive power, made of glass material, the projection side surface S16 is a concave surface, the image source side surface S17 is a concave surface and both of the projection side surface S16 and image source side surface S17 are spherical surfaces, the fourth lens L14 is a biconvex lens with positive refractive power, made of glass material, the projection side surface S18 is a convex surface, the image source side surface S19 is a convex surface and both of the projection side surface S18 and image source side surface S19 are spherical surfaces. The fourth lens group $LG_{14}$ is with positive refractive power and includes a fifth lens L15, wherein the fifth lens L15 is a biconvex lens with positive refractive power, made of glass material, and the projection side surface S110 is a convex surface, the image source side surface S111 is a convex surface and both of the projection side surface S110 and image source side surface S111 are aspheric surfaces. Both of the projection side surface S112 and image source side surface S113 of the prism P1 are plane surfaces.

In order to maintain excellent optical performance of the projection lens assembly in accordance with the first embodiment of the invention, the projection lens assembly 1 satisfies the following seven conditions:

$$1.4 < F1 < 3.5 \tag{1}$$

$$0.6 < R1_{12}/f1 < 1.5 \tag{2}$$

$$Vd1_1 > 40 \tag{3}$$

$$Nd1_2 > 1.6 \tag{4}$$

$$Nd1_3 > 1.6 \tag{5}$$

$$Nd1_4 > 1.6 \tag{6}$$

$$Vd1_3 < 35 \tag{7}$$

wherein F1 is an F-number of the projection lens assembly 1, $R1_{12}$ is a radius of curvature of an image source side surface S12 of the first lens L11, f1 is an effective focal length of the projection lens assembly 1, $Vd1_1$ is an Abbe number of the first lens L11, $Nd1_2$ is an index of refraction of the second lens L12, $Nd1_3$ is an index of refraction of the third lens L13, $Nd1_4$ is an index of refraction of the fourth lens L14 and $Vd1_3$ is an Abbe number of the third lens L13.

By the above design of the lenses and stop ST1, the projection lens assembly 1 is provided with an effective reduced volume, a decreased F-number, an effective corrected aberration, an increased resolution and a decreased effect of temperature change on image quality.

In order to achieve the above purposes and effectively enhance the optical performance, the projection lens assembly 1 in accordance with the first embodiment of the invention is provided with the optical specifications shown in Table 1, which include the effective focal length, F-number, curvature of each lens surface, thickness between adjacent surface, refractive index of each lens and Abbe number of each lens. Table 1 shows that the effective focal length is equal to 16.8 mm and F-number is equal to 1.5 for the projection lens assembly 1 of the first embodiment of the invention.

TABLE 1

Effective Focal Length = 16.8 mm
F-number = 1.5

| Surface Number | Curvature ($mm^{-1}$) | Thickness (mm) | Nd | Vd | Remark |
|---|---|---|---|---|---|
| S11 | 0.0069 | 3.5 | 1.48 | 70 | The First Lens L11 |
| S12 | 0.079 | 31.8 | | | |
| S13 | 0.026 | 4.9 | 1.8 | 46.5 | The Second Lens L12 |
| S14 | −0.01 | 7.5 | | | |
| S15 | 0 | 12.7 | | | Stop ST1 |
| S16 | −0.057 | 1.4 | 1.77 | 26 | The Third Lens L13 |
| S17 | 0.018 | 0.5 | | | |
| S18 | 0.026 | 5.9 | 1.67 | 55 | The Fourth Lens L14 |
| S19 | −0.037 | 5.4 | | | |
| S110 | 0.025 | 5.6 | 1.56 | 59 | The Fifth Lens L15 |
| S111 | −0.03 | 5.4 | | | |
| S112 | 0 | 25.7 | 1.51 | 64 | Prism P1 |
| S113 | 0 | 3.3 | | | |

The aspheric surface sag z of each lens in table 1 can be calculated by the following formula:

$$z = ch^2/\{1+[1-(k+1)c^2h^2]^{1/2}\} + Ah^4 + Bh^6 + Ch^8 + Dh^{10} + Eh^{12} + Fh^{14} + Gh^{16}$$

where c is curvature, h is the vertical distance from the lens surface to the optical axis, k is conic constant and A, B, C, D, E, F and G are aspheric coefficients.

In the first embodiment, the conic constant k and the aspheric coefficients A, B, C, D, E, F, G of each surface are shown in Table 2.

TABLE 2

| | S11 | S12 | S110 | S111 |
|---|---|---|---|---|
| k | −497.07 | 0.84 | −2.16 | −6.51 |
| A | −1.224838e−005 | −2.886248e−005 | 3.828786e−006 | 3.5927583e−006 |
| B | 6.4164728e−008 | 1.8624066e−007 | −1.267522e−007 | −5.725452e−008 |
| C | −1.194320e−010 | −4.775248e−010 | 1.2795586e−009 | 1.0222119e−009 |
| D | −2.652952e−013 | 1.2786573e−012 | −5.590307e−012 | −4.458579e−012 |
| E | 9.6419057e−016 | −2.403183e−014 | 0 | 0 |
| F | 1.0906827e−018 | 1.6232737e−016 | 0 | 0 |
| G | −4.272803e−021 | −3.374944e−019 | 0 | 0 |

For the projection lens assembly 1 of the first embodiment, the F-number F1 of the projection lens assembly 1 is equal to 1.5, the radius of curvature $R1_{12}$ of the image source side surface S12 of the first lens L11 is equal to 12.66 mm, the effective focal length f1 of the projection lens assembly 1 is equal to 16.8 mm, the Abbe number $Vd1_1$ of the first lens L11 is equal to 70, the index of refraction $Nd1_2$ of the second lens L12 is equal to 1.8, the index of refraction $Nd1_3$ of the third lens L13 is equal to 1.77, the index of refraction $Nd1_4$ of the fourth lens L14 is equal to 1.67 and the Abbe number $Vd1_3$ of the third lens L13 is equal to 26. According to the above data, the following values can be obtained:

$F1=1.5,$ $R1_{12}/f1=0.75,$ $Vd1_1=70,$ $Nd1_2=1.8,$ $Nd1_3=1.77,$ $Nd1_4=1.67,$ $Vd1_4=26$ which respectively satisfy the above conditions (1)-(7).

Figure 2A:
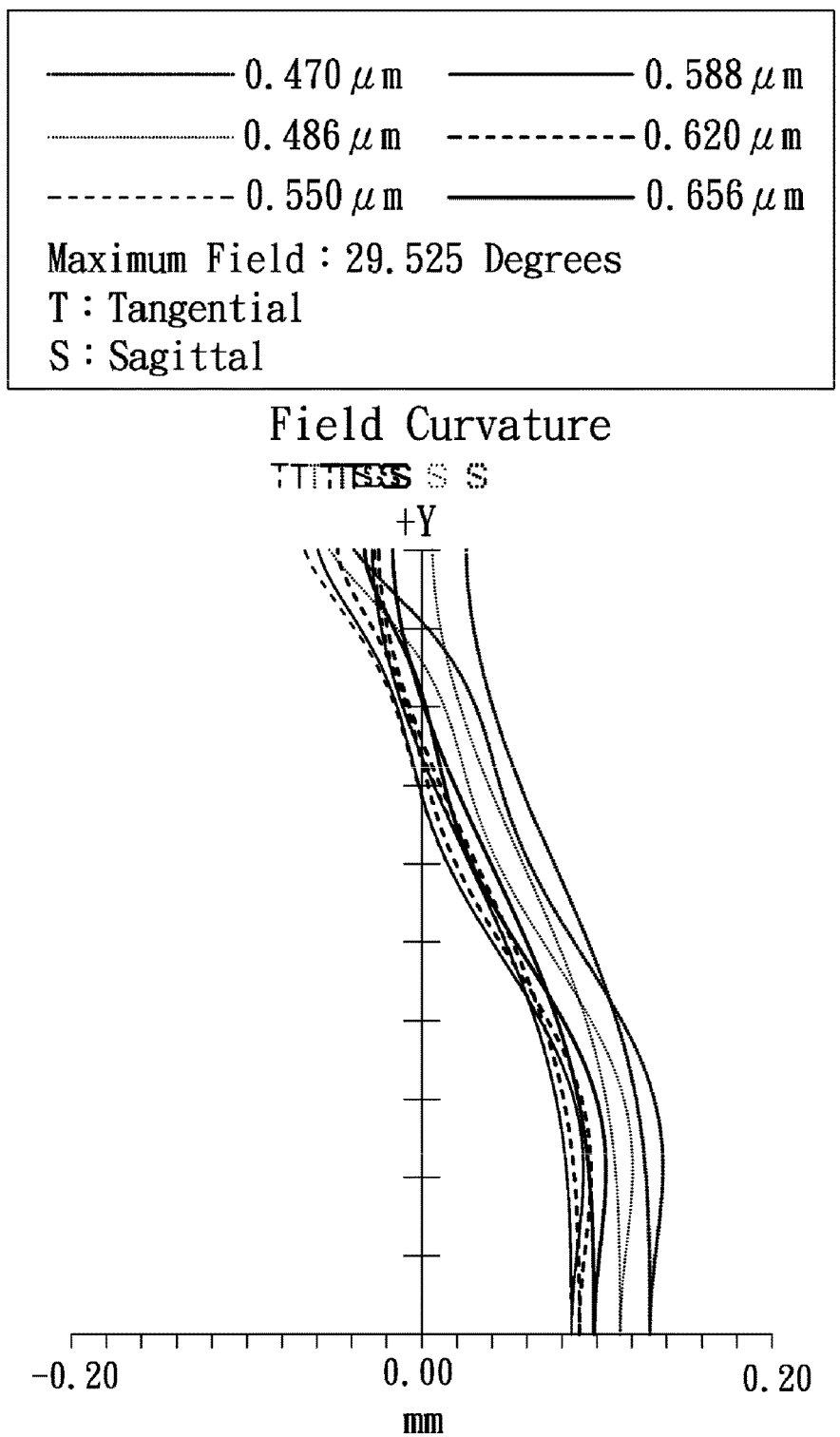
FIG. 2A depicts a field curvature diagram of the projection lens assembly in accordance with the first embodiment of the invention.
Figure 2B:
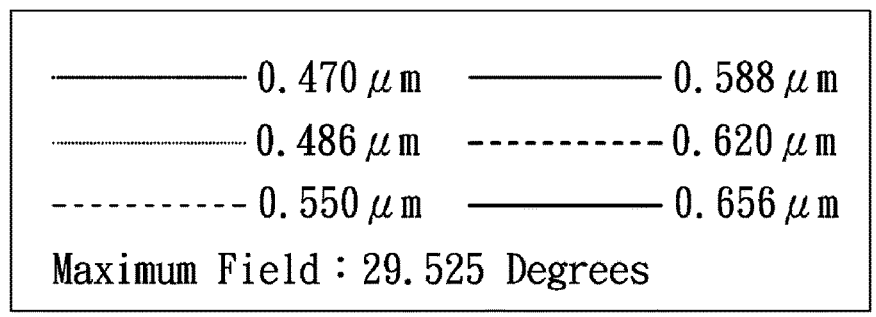
FIG. 2B is a distortion diagram of the projection lens assembly in accordance with the first embodiment of the invention.
Figure 2B:
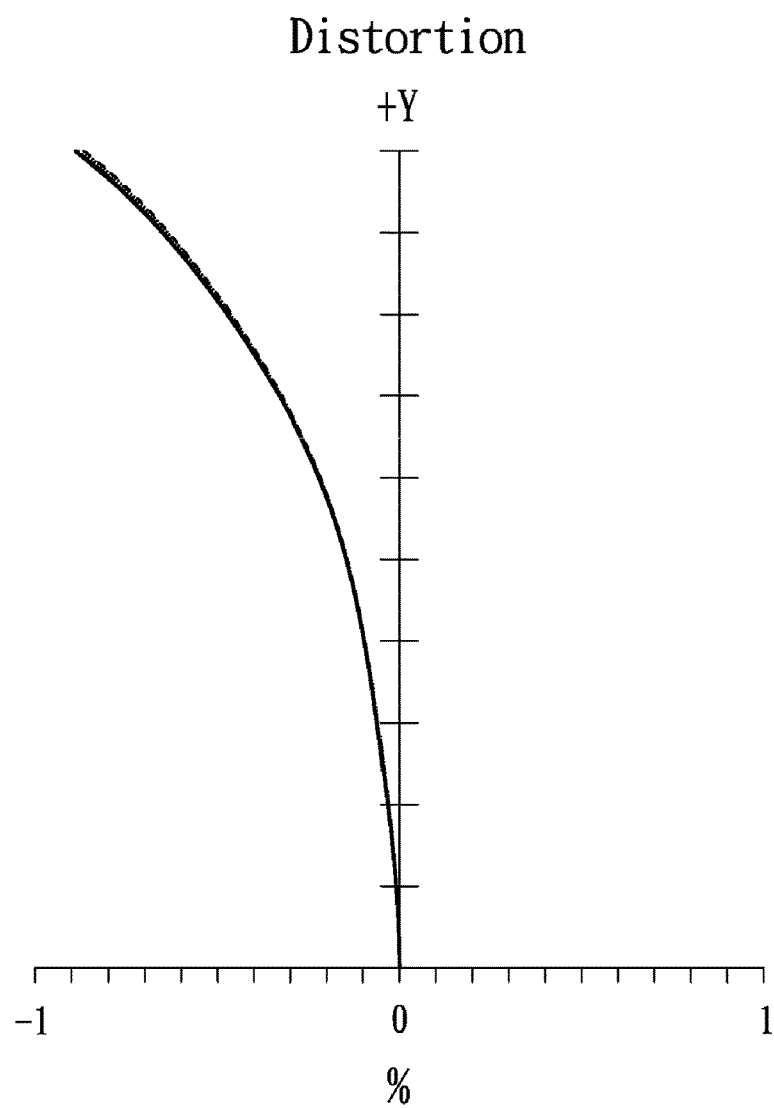
Figure 2C:
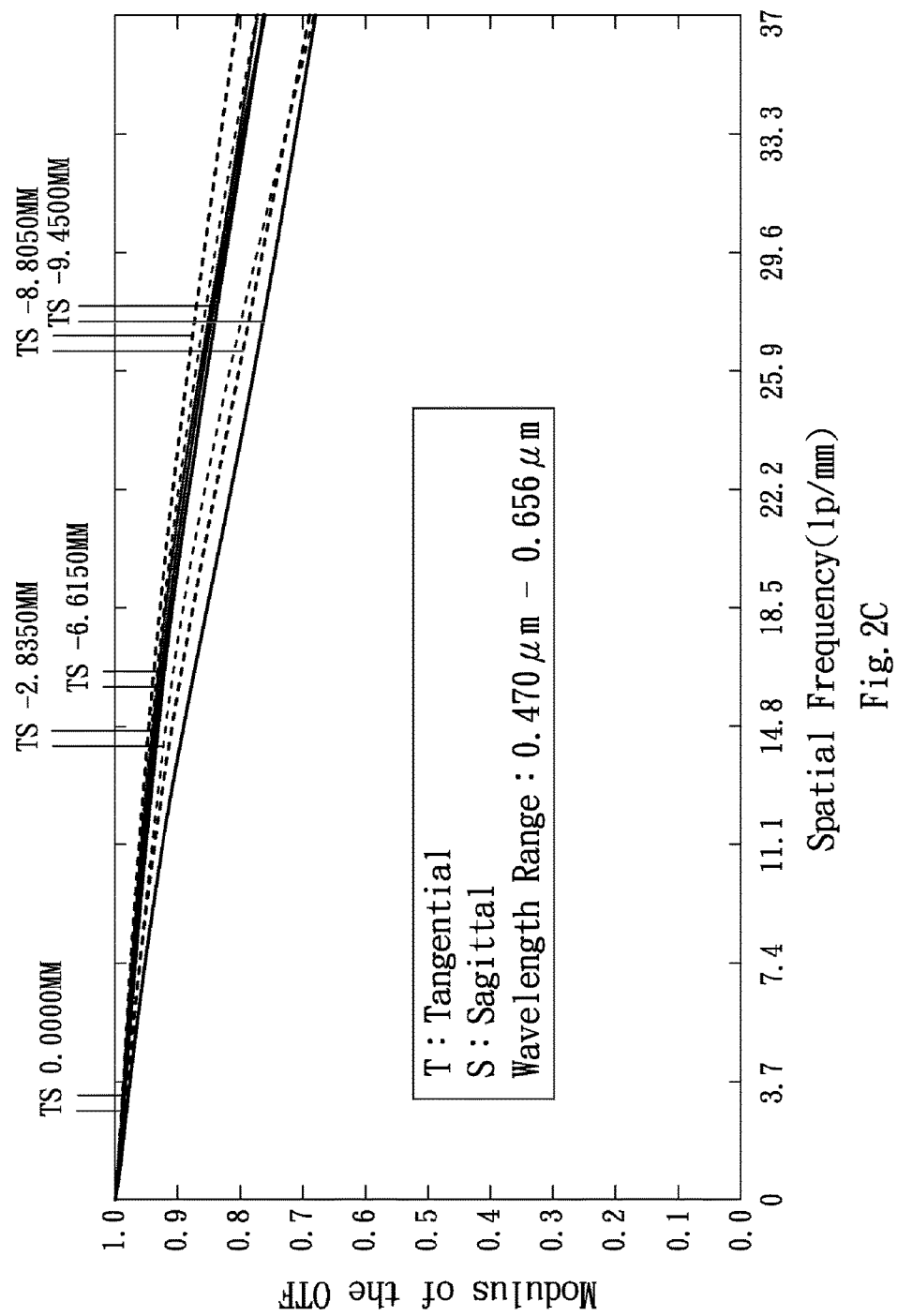
FIG. 2C is a modulation transfer function diagram of the projection lens assembly in accordance with the first embodiment of the invention.
Figure 2D:
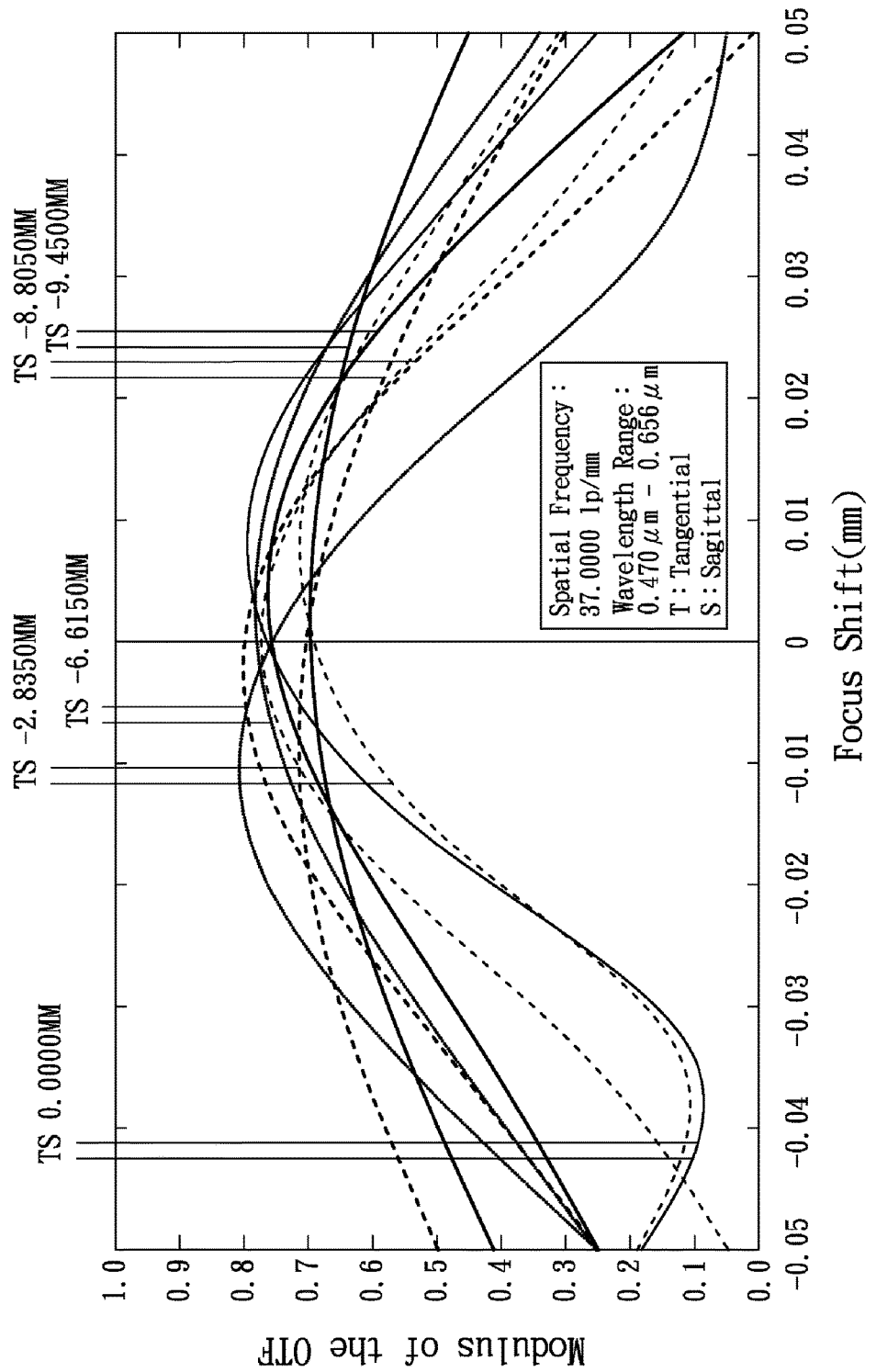
FIG. 2D is a through focus modulation transfer function diagram of the projection lens assembly in accordance with the first embodiment of the invention.
Figure 2E:
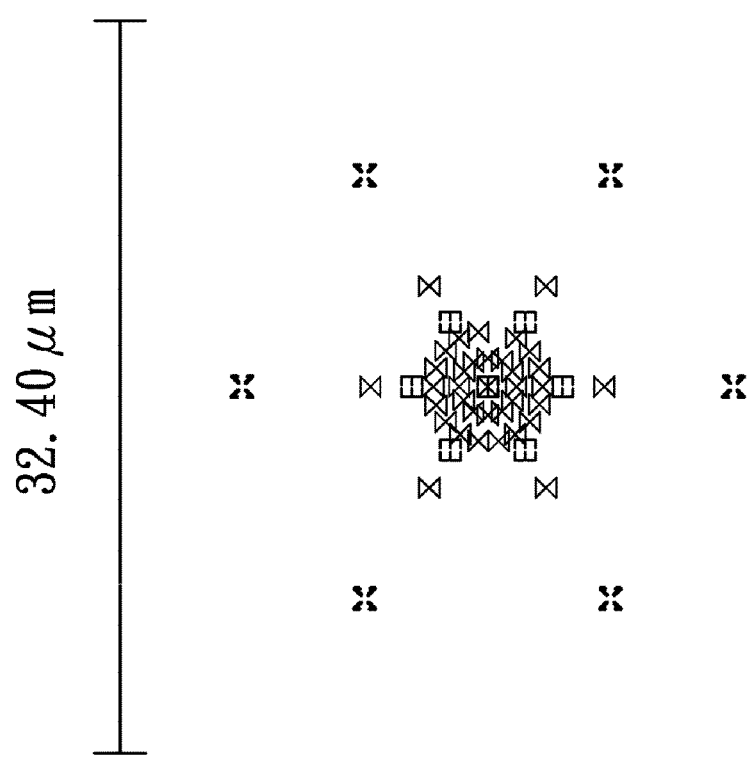
FIGS. 2E-2G are spot diagrams of the projection lens assembly in accordance with the first embodiment of the invention.
Figure 2F:
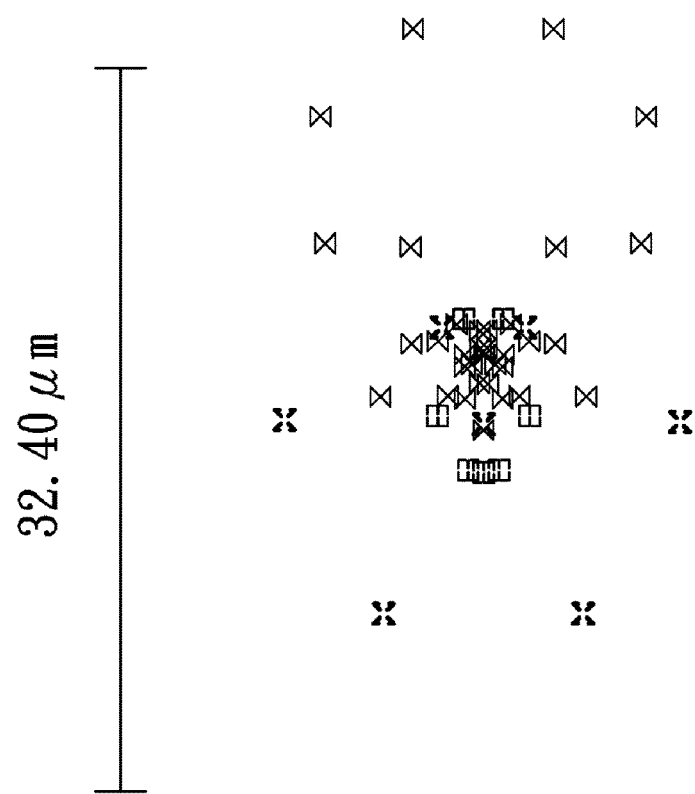
Figure 2G:
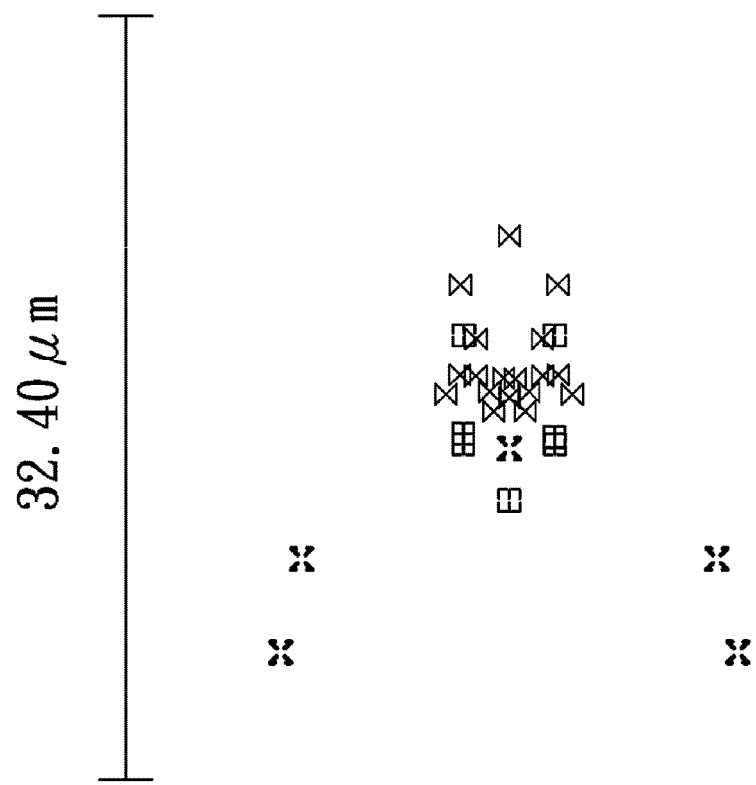

By the above arrangements of the lenses and stop ST1, the projection lens assembly 1 of the first embodiment can meet the requirements of optical performance as seen in FIGS. 2A-2G, wherein FIG. 2A shows a field curvature diagram of the projection lens assembly 1 in accordance with the first embodiment of the invention, FIG. 2B shows a distortion diagram of the projection lens assembly 1 in accordance with the first embodiment of the invention, FIG. 2C shows a modulation transfer function diagram of the projection lens assembly 1 in accordance with the first embodiment of the invention, FIG. 2D shows a through focus modulation transfer function diagram of the projection lens assembly 1 in accordance with the first embodiment of the invention and FIGS. 2E-2G show spot diagrams of the projection lens assembly 1 in accordance with the first embodiment of the invention.

It can be seen from FIG. 2A that the field curvature of tangential direction and sagittal direction in the projection lens assembly 1 of the first embodiment ranges from −0.07 mm to 0.14 mm for the wavelength of 0.470 μm, 0.486 μm, 0.550 μm, 0.588 μm, 0.620 μm and 0.656 μm. It can be seen from FIG. 2B (in which the six lines in the figure almost coincide to appear as if a signal line) that the distortion in the projection lens assembly 1 of the first embodiment ranges from −0.9% to 0% for the wavelength of 0.470 μm, 0.486 μm, 0.550 μm, 0.588 μm, 0.620 μm and 0.656 μm. It can be seen from FIG. 2C that the modulation transfer function of tangential direction and sagittal direction in the projection lens assembly 1 of the first embodiment ranges from 0.67 to 1.0 wherein the wavelength ranges from 0.470 μm to 0.656 μm, the fields respectively are 0.0000 mm, −2.8350 mm, −6.6150 mm, −8.8050 mm and −9.450 mm, and the spatial frequency ranges from 0 lp/mm to 37 lp/mm. It can be seen from FIG. 2D that the through focus modulation transfer function of tangential direction and sagittal direction in the projection lens assembly 1 of the first embodiment is greater than 0.2 as focus shift ranges between −0.028 mm and 0.031 mm wherein the wavelength ranges from 0.470 μm to 0.656 μm, each field is 0.0000 mm, −2.8350 mm, −6.6150 mm, −8.8050 mm and −9.4500 mm, spatial frequency is equal to 37.0000 lp/mm. It can be seen from FIGS. 2E-2G that the root mean square spot radius is equal to 4.545 μm, 6.848 μm, 8.445 μm and geometrical spot radius is equal to 10.829 μm, 18.240 μm, 26.934 μm for the field of 0.000 mm, −2.835 mm and −9.450 mm, and wavelength of 0.470 μm, 0.486 μm, 0.550 μm, 0.588 μm, 0.620 μm and 0.656 μm in the projection lens assembly 1 of the first embodiment. It is obvious that the field curvature and the distortion of the projection lens assembly 1 of the first embodiment can be corrected effectively, and the resolution and the depth of focus of the projection lens assembly 1 of the first embodiment can meet the requirements. Therefore, the projection lens assembly 1 of the first embodiment is capable of good optical performance.

The conditions 1.4<F1<3.5 and 0.6<R1$_2$/f1<1.5 are basic requirements for the present invention. The numerical values of the embodiments of the present invention also fall within the scope of the remaining conditions. The condition 1.4<F1<3.5 limits the luminous flux of the projection lens assembly, the smaller the value the greater the luminous flux, and more preferable condition is 1.4<F1<2.5. The projection lens assembly which satisfies the condition 0.6<R1$_{12}$/f1<1.5 can project relative large angle within relative small optical path, and more preferable condition is 0.6<R1$_{12}$/f1<1.2. The conditions Vd1$_1$>40, Nd1$_2$>1.6, Nd1$_3$>1.6, Vd1$_3$<35 and Nd1$_4$>1.6 restrict the material type of the first, second, third and fourth lens respectively. More preferable conditions are 71>Vd1$_1$>40, 1.9>Nd1$_2$>1.6, 1.78>Nd1$_3$>1.6, 25<Vd1$_3$<35 and 1.68>Nd1$_4$>1.6.

Figure 3:
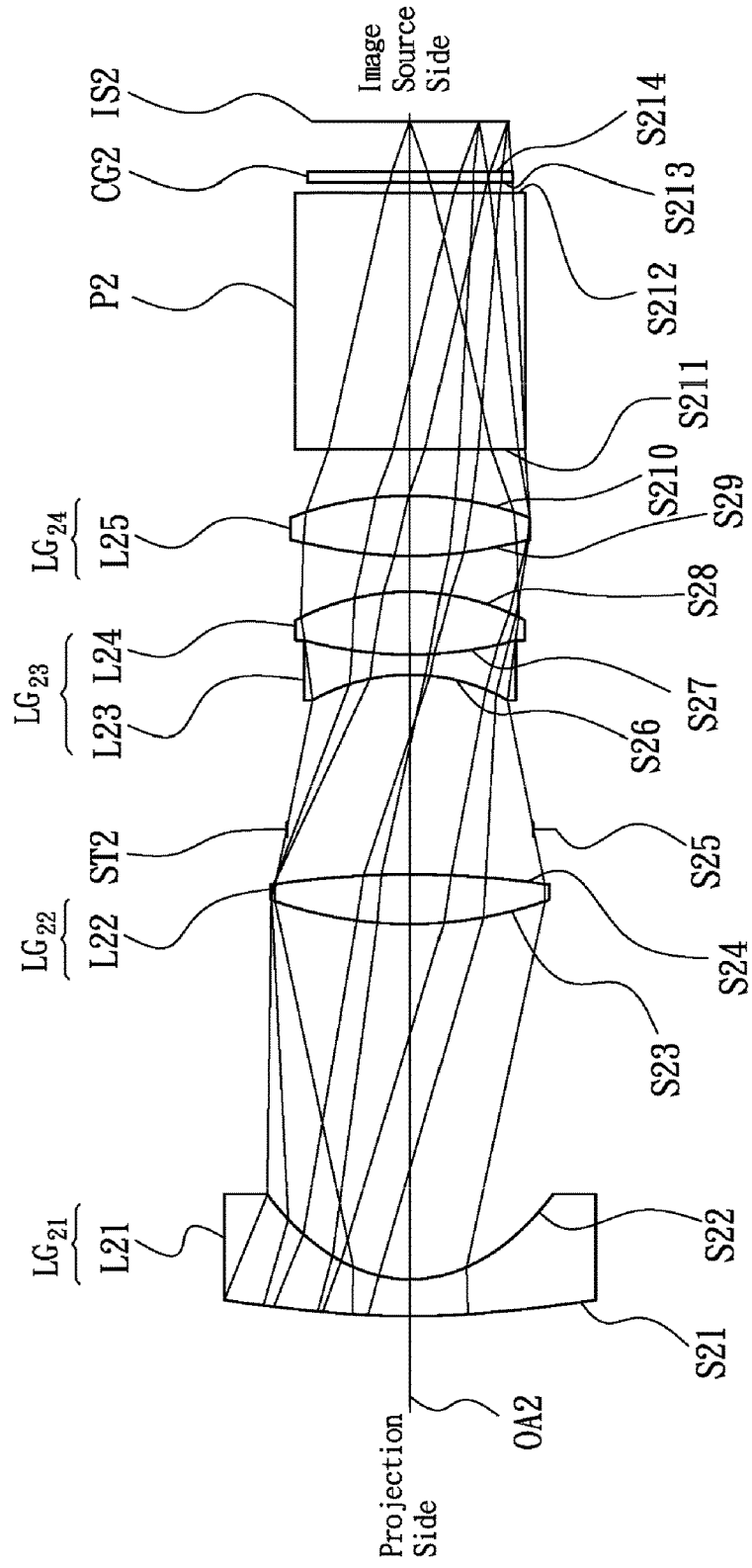
FIG. 3 is a lens layout and optical path diagram of a projection lens assembly in accordance with a second embodiment of the invention.

Referring to FIG. 3, FIG. 3 is a lens layout and optical path diagram of a projection lens assembly in accordance with a second embodiment of the invention. The projection lens assembly 2 includes a first lens group LG$_{21}$, a second lens group LG$_{22}$, a stop ST2, a third lens group LG$_{23}$, a fourth lens group LG$_{24}$, a prism P2 and a cover glass CG2, all of which are arranged in order from a projection side to an image source side along an optical axis OA2. In operation, light rays from an image source IS2 are projected on the projection side. The first lens group LG$_{21}$ is with negative refractive power and includes a first lens L21, wherein the first lens L21 is a meniscus lens with negative refractive power, made of plastic material, and the projection side surface S21 is a convex surface, the image source side surface S22 is a concave surface and both of the projection side surface S21 and image source side surface S22 are aspheric surfaces. The second lens group LG$_{22}$ is with positive refractive power and includes a second lens L22, wherein the second lens 22 is a biconvex lens with positive refractive power, made of glass material, and the projection side surface S23 is a convex surface, the image source side surface S24 is a convex surface and both of the projection side surface S23 and image source side surface S24 are spherical surfaces. The third lens group LG$_{23}$ includes a third lens L23 and a fourth lens L24, wherein the third lens L23 and the fourth lens L24 are cemented together to form a cemented lens, the third lens L23 is a biconcave lens with negative refractive power, made of glass material, the projection side surface S26 is a concave surface, the image source side surface S27 is a concave surface and both of the projection side surface S26 and image source side surface S27 are spherical surfaces, the fourth lens L24 is a biconvex lens with positive refractive power, made of glass material, the projection side surface S27 is a convex surface, the image source side surface S28 is a convex surface and both of the projection side surface S27 and image source side surface S28 are spherical surfaces. The fourth lens group LG$_{24}$ is with positive refractive power and includes a fifth lens L25, wherein the fifth lens L25 is a biconvex lens with positive refractive power, made of plastic material, and the projection side surface S29 is a convex surface, the image source side surface S210 is a convex surface and both of the projection side surface S29 and image source side surface S210 are aspheric surfaces. Both of the projection side surface S211 and image source side surface S212 of the prism P2 are plane surfaces. Both of the projection side surface S213 and image source side surface S214 of the cover glass CG2 are plane surfaces.

In order to maintain excellent optical performance of the projection lens assembly in accordance with the second embodiment of the invention, the projection lens assembly 2 satisfies the following seven conditions:

$$1.4<F2<3.5 \quad (8)$$

$$0.6<R2_{12}/f_2<1.5 \quad (9)$$

$$Vd2_1>40 \quad (10)$$

$$Nd2_2>1.6 \quad (11)$$

$$Nd2_3>1.6 \quad (12)$$

$$Nd2_4>1.6 \quad (13)$$

$$Vd2_3<35 \quad (14)$$

wherein F2 is an F-number of the projection lens assembly 2, R2$_{12}$ is a radius of curvature of an image source side surface S22 of the first lens L21, f2 is an effective focal length of the projection lens assembly 2, Vd2$_1$ is an Abbe number of the first lens L21 Nd2$_2$ is an index of refraction of the second lens L22, Nd2$_3$ is an index of refraction of the third lens L23, Nd2$_4$ is an index of refraction of the fourth lens L24 and Vd2$_3$ is an Abbe number of the third lens L23.

By the above design of the lenses and stop ST2, the projection lens assembly 2 is provided with an effective reduced volume, a decreased F-number, an effective corrected aberration, an increased resolution and a decreased effect of temperature change on image quality.

In order to achieve the above purposes and effectively enhance the optical performance, the projection lens assembly 2 in accordance with the second embodiment of the invention is provided with the optical specifications shown in Table 3, which include the effective focal length, F-number, curvature of each lens surface, thickness between adjacent surface, refractive index of each lens and Abbe number of each lens. Table 3 shows that the effective focal length is equal to 16.8 mm and F-number is equal to 1.5 for the projection lens assembly 2 of the second embodiment of the invention.

TABLE 3

Effective Focal Length = 16.8 mm
F-number = 1.5

| Surface Number | Curvature (mm$^{-1}$) | Thickness (mm) | Nd | Vd | Remark |
|---|---|---|---|---|---|
| S21 | 0.014 | 3.5 | 1.52 | 56 | The First Lens L21 |
| S22 | 0.081 | 34.2 | | | |
| S23 | 0.025 | 4.8 | 1.8 | 40 | The Second Lens L22 |
| S24 | −0.010 | 4.3 | | | |
| S25 | 0 | 14.8 | | | Stop ST2 |
| S26 | −0.052 | 2 | 1.77 | 26 | The Third Lens L23 |
| S27 | 0.025 | 6 | 1.64 | 58 | The Fourth Lens L24 |
| S28 | −0.042 | 3.5 | | | |
| S29 | 0.026 | 5.8 | 1.52 | 56 | The Fifth Lens L25 |
| S210 | −0.032 | 4.4 | | | |
| S211 | 0 | 24.7 | 1.51 | 64 | Prism P2 |
| S212 | 0 | 1.00 | | | |
| S213 | 0 | 1.00 | 1.51 | 64 | Cover Glass CG2 |
| S214 | 0 | 4.8 | | | |

The aspheric surface sag z of each lens in table 3 can be calculated by the following formula:

$$z=ch^2/\{1+[1-(k+1)c^2h^2]^{1/2}\}+Ah^4+Bh^6+Ch^8+Dh^{10}+Eh^{12}+Fh^{14}+Gh^{16}$$

where c is curvature, h is the vertical distance from the lens surface to the optical axis, k is conic constant and A, B, C, D, E, F and G are aspheric coefficients.

In the second embodiment, the conic constant k and the aspheric coefficients A, B, C, D, E, F, G of each surface are shown in Table 4.

TABLE 4

| | Surface Number | | | |
|---|---|---|---|---|
| | S21 | S22 | S29 | S210 |
| k | −73.13 | −0.85 | −3.23 | −4.64 |
| A | −1.747864e−006 | −2.376237e−005 | 2.626511e−006 | −4.591482e−006 |
| B | 4.5452153e−008 | 2.4676978e−007 | −1.388714e−007 | −1.079933e−007 |
| C | −1.324905e−010 | −4.274597e−010 | 1.1012595e−009 | 9.3509169e−010 |
| D | −1.841761e−013 | −6.332489e−013 | −4.603729e−012 | −4.051903e−012 |
| E | 9.7166954e−016 | −2.580994e−014 | 0 | 0 |
| F | 3.8453573e−019 | 2.0226254e−016 | 0 | 0 |
| G | −2.675532e−021 | −3.791466e−019 | 0 | 0 |

For the projection lens assembly 2 of the second embodiment, the F-number F2 of the projection lens assembly 2 is equal to 1.5, the radius of curvature $R2_{12}$ of the image source side surface S2 of the first lens L21 is equal to 12.35 mm, the effective focal length f2 of the projection lens assembly 2 is equal to 16.8 mm, the Abbe number $Vd2_1$ of the first lens L21 is equal to 56, the index of refraction $Nd2_2$ of the second lens L22 is equal to 1.8, the index of refraction $Nd2_3$ of the third lens L23 is equal to 1.77, the index of refraction $Nd2_4$ of the fourth lens L24 is equal to 1.64 and the Abbe number $Vd2_3$ of the third lens L23 is equal to 26. According to the above data, the following values can be obtained:

$F2=1.5$, $R2_{12}/f2=0.74$, $Vd2_1=56$, $Nd2_2=1.8$, $Nd2_3=1.77$, $Nd2_4=1.64$, $Vd2_3=26$ which respectively satisfy the above conditions (8)-(14).

Figure 4A:
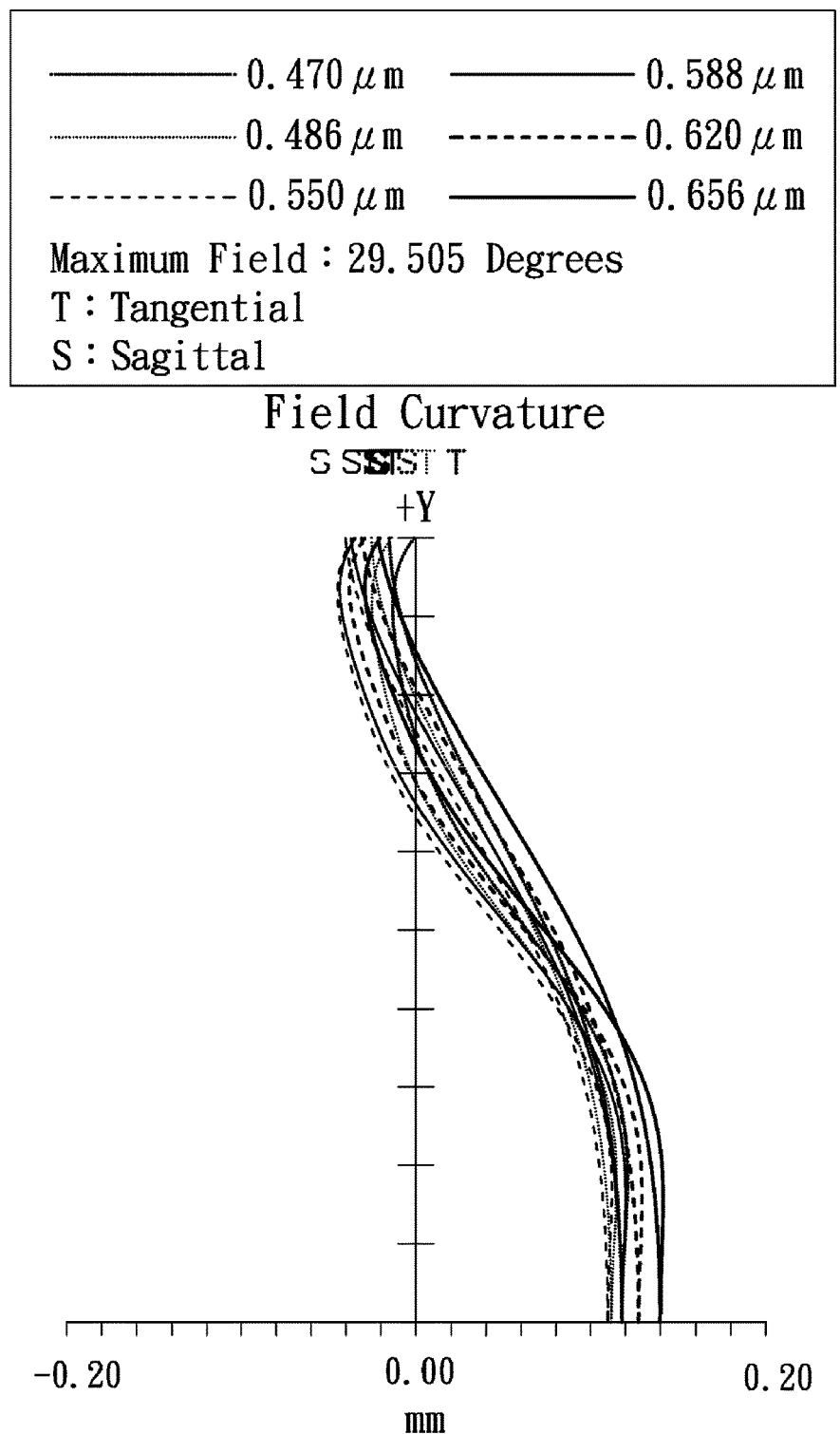
FIG. 4A depicts a field curvature diagram of the projection lens assembly in accordance with the second embodiment of the invention.
Figure 4B:
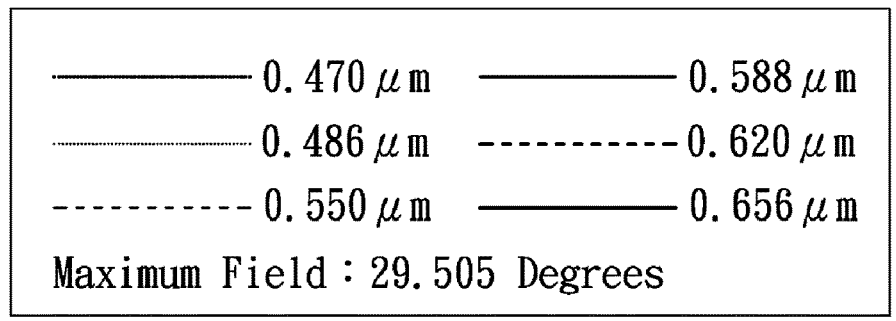
FIG. 4B is a distortion diagram of the projection lens assembly in accordance with the second embodiment of the invention.
Figure 4B:
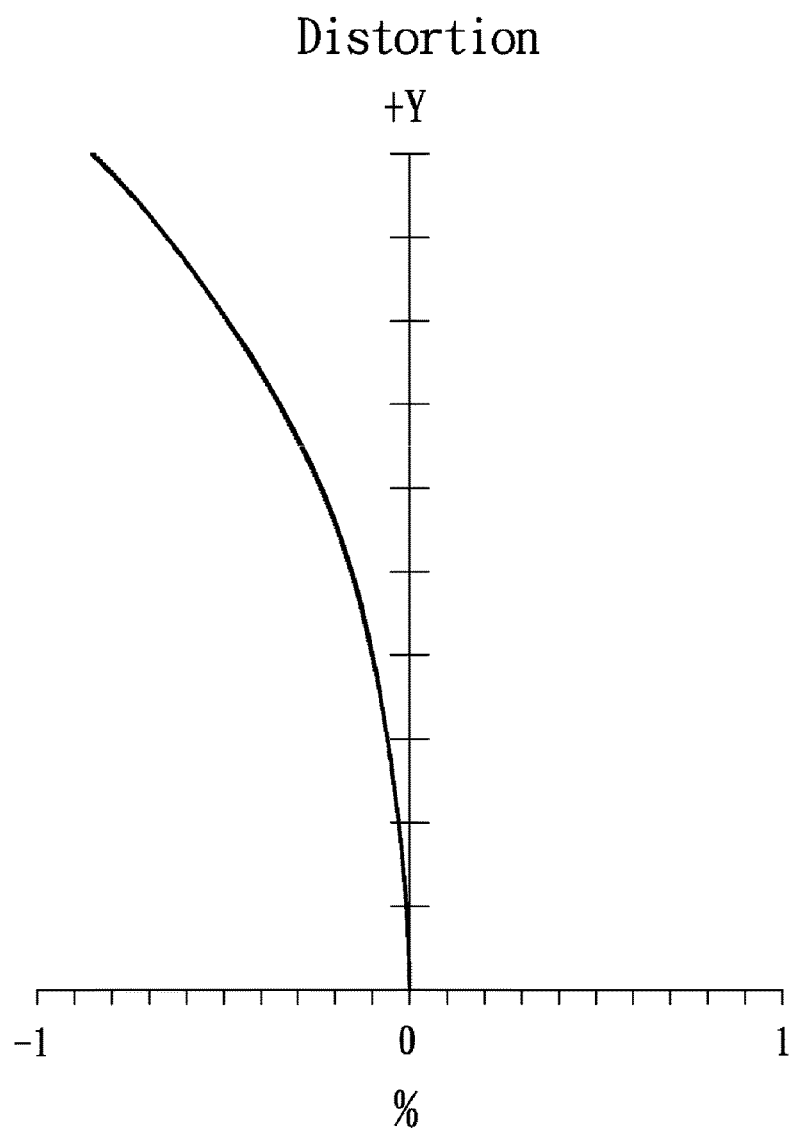
Figure 4D:
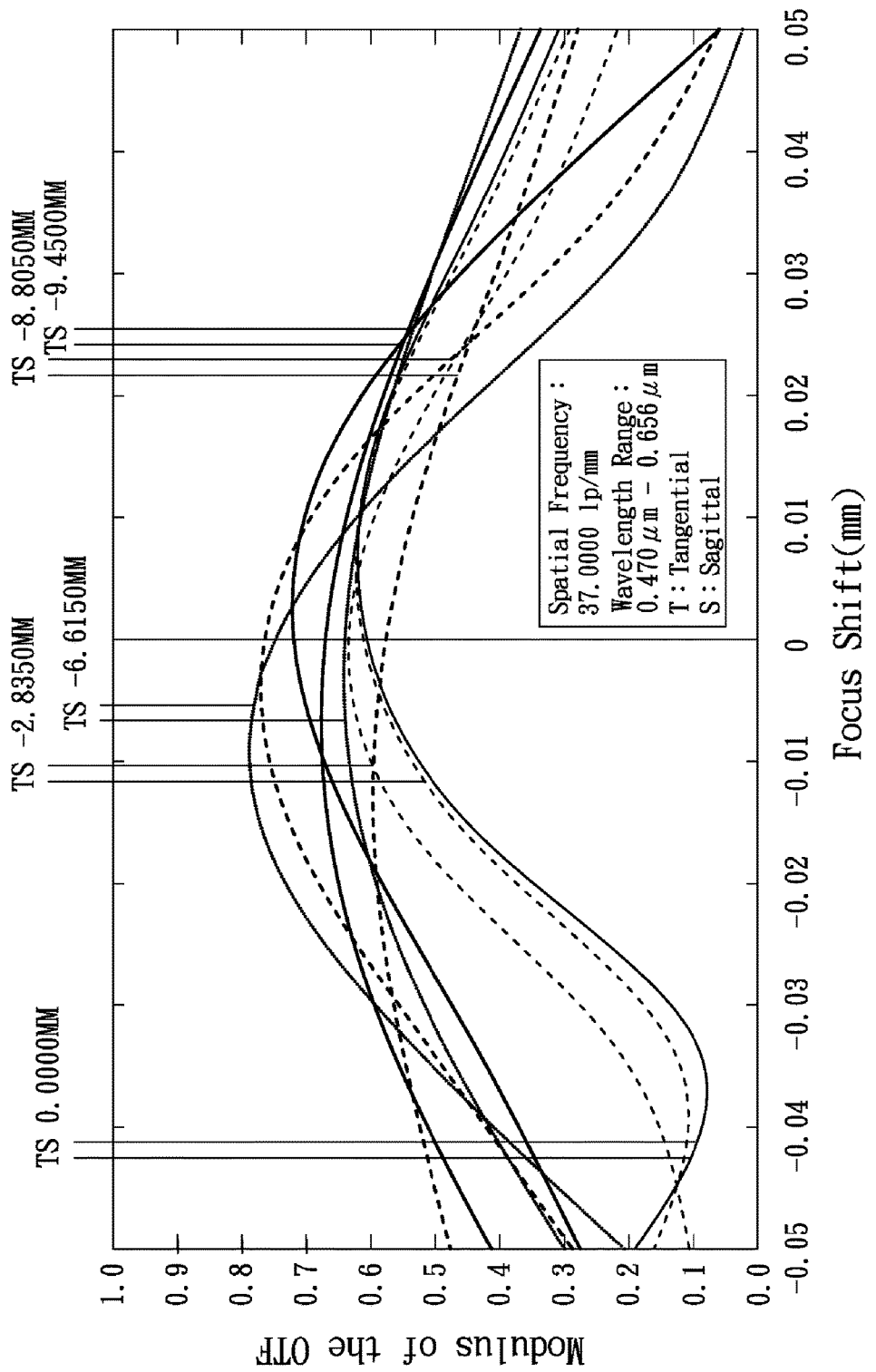
FIG. 4D is a through focus modulation transfer function diagram of the projection lens assembly in accordance with the second embodiment of the invention.
Figure 4E:
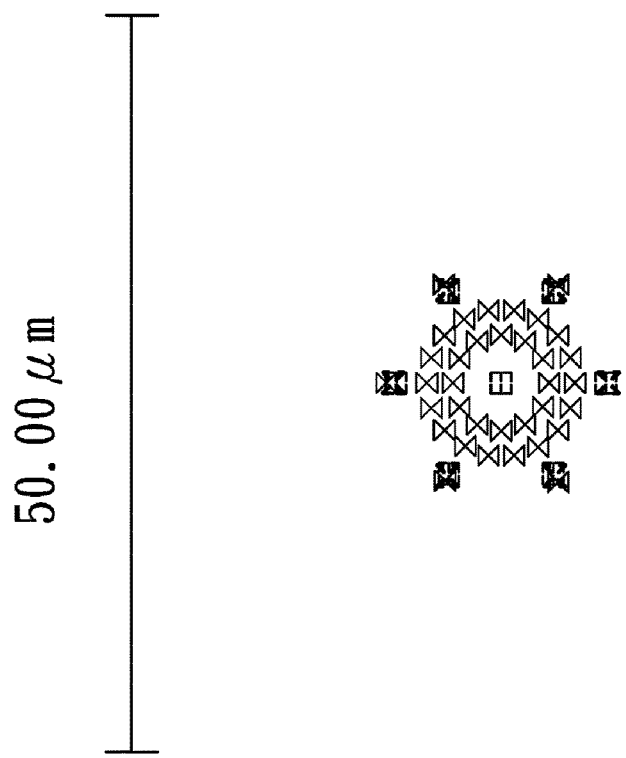
FIGS. 4E-4G are spot diagrams of the projection lens assembly in accordance with the second embodiment of the invention.
Figure 4F:
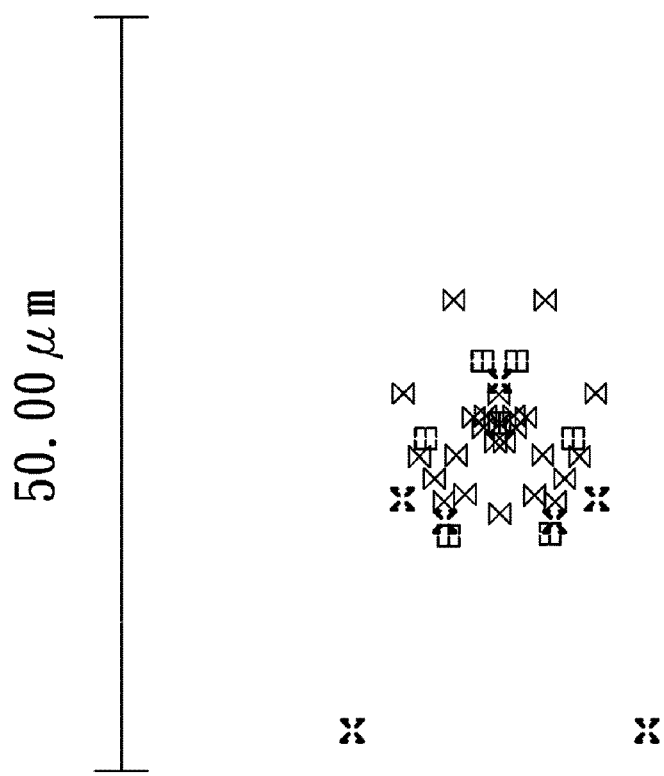
Figure 4G:
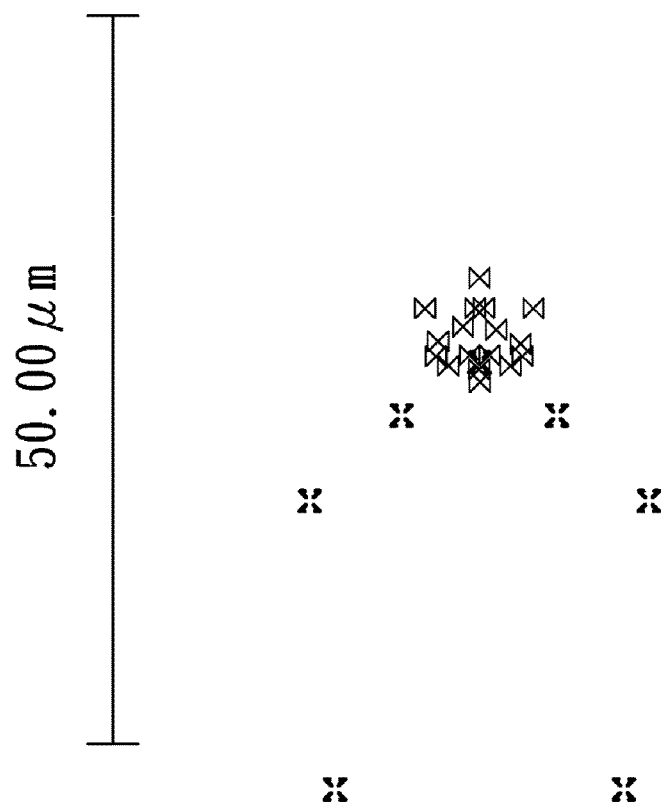

By the above arrangements of the lenses and stop ST2, the projection lens assembly 2 of the second embodiment can meet the requirements of optical performance as seen in FIGS. 4A-4G, wherein FIG. 4A shows a field curvature diagram of the projection lens assembly 2 in accordance with the second embodiment of the invention, FIG. 4B shows a distortion diagram of the projection lens assembly 2 in accordance with the second embodiment of the invention, FIG. 4C shows a modulation transfer function diagram of the projection lens assembly 2 in accordance with the second embodiment of the invention, FIG. 4D shows a through focus modulation transfer function diagram of the projection lens assembly 2 in accordance with the second embodiment of the invention and FIGS. 4E-4G show spot diagrams of the projection lens assembly 2 in accordance with the second embodiment of the invention.

It can be seen from FIG. 4A that the field curvature of tangential direction and sagittal direction in the projection lens assembly 2 of the second embodiment ranges from −0.05 mm to 0.15 mm for the wavelength of 0.470 μm, 0.486 μm, 0.550 μm, 0.588 μm, 0.620 μ and 0.656μ. It can be seen from FIG. 4B (in which the six lines in the figure almost coincide to appear as if a signal line) that the distortion in the projection lens assembly 2 of the second embodiment ranges from −0.9% to 0% for the wavelength of 0.470 μm, 0.486 μm, 0.550 μm, 0.588 μm, 0.620 μm and 0.656 μm. It can be seen from FIG. 4C that the modulation transfer function of tangential direction and sagittal direction in the projection lens assembly 2 of the second embodiment ranges from 0.57 to 1.0 wherein the wavelength ranges from 0.470 μm to 0.656 μm, the fields respectively are 0.0000 mm, −2.8350 mm, −6.6150 mm, −8.8050 mm and −9.4500 mm, and the spatial frequency ranges from 0 lp/mm to 37 lp/mm. It can be seen from FIG. 4D that the through focus modulation transfer function of tangential direction and sagittal direction in the projection lens assembly 2 of the second embodiment is greater than 0.2 as focus shift ranges between −0.026 mm and 0.032 mm wherein the wavelength ranges from 0.470 μm to 0.656 μm, each field is 0.0000 mm, −2.8350 mm, −6.6150 mm, −8.8050 mm and −9.4500 mm, spatial frequency is equal to 37 lp/mm. It can be seen from FIGS. 4E-4G that the root mean square spot radius is equal to 5.533 μm, 8.145 μm, 9.088 μm and geometrical spot radius is equal to 7.738 μm, 24.387 μm, 29.781 μm for the field of 0.000 mm, −2.835 mm and −9.450 mm, and wavelength of 0.470 μm, 0.486 μm, 0.550 μm, 0.588 μm, 0.620 μm and 0.656 μm in the projection lens assembly 2 of the second embodiment. It is obvious that the field curvature and the distortion of the projection lens assembly 2 of the second embodiment can be corrected effectively, and the resolution and the depth of focus of the projection lens assembly 2 of the second embodiment can meet the requirements. Therefore, the projection lens assembly 2 of the second embodiment is capable of good optical performance.

The conditions $1.4<F2<3.5$ and $0.6<R2_{12}/f2<1.5$ are basic requirements for the present invention. The numerical values of the embodiments of the present invention also fall within the scope of the remaining conditions. The condition $1.4<F2<3.5$ limits the luminous flux of the projection lens assembly, the smaller the value the greater the luminous flux, and more preferable condition is $1.4<F2<1.6$. The projection lens assembly which satisfies the condition $0.6<R2_{12}/f2<1.5$ can project relative large angle within relative small optical path, and more preferable condition is $0.6<R2_{12}/f2<0.75$. The conditions $Vd2_1>40$, $Nd2_2>1.6$, $Nd2_3>1.6$, $Vd2_3<35$ and $Nd2_4>1.6$ restrict the material type of the first, second, third and fourth lens respectively. More preferable conditions are $57>Vd2_1>40$, $1.9>Nd2_2>1.6$, $1.78>Nd2_3>1.6$, $25<Vd2_3<35$ and $1.68>Nd2_4>1.6$.

Figure 5:
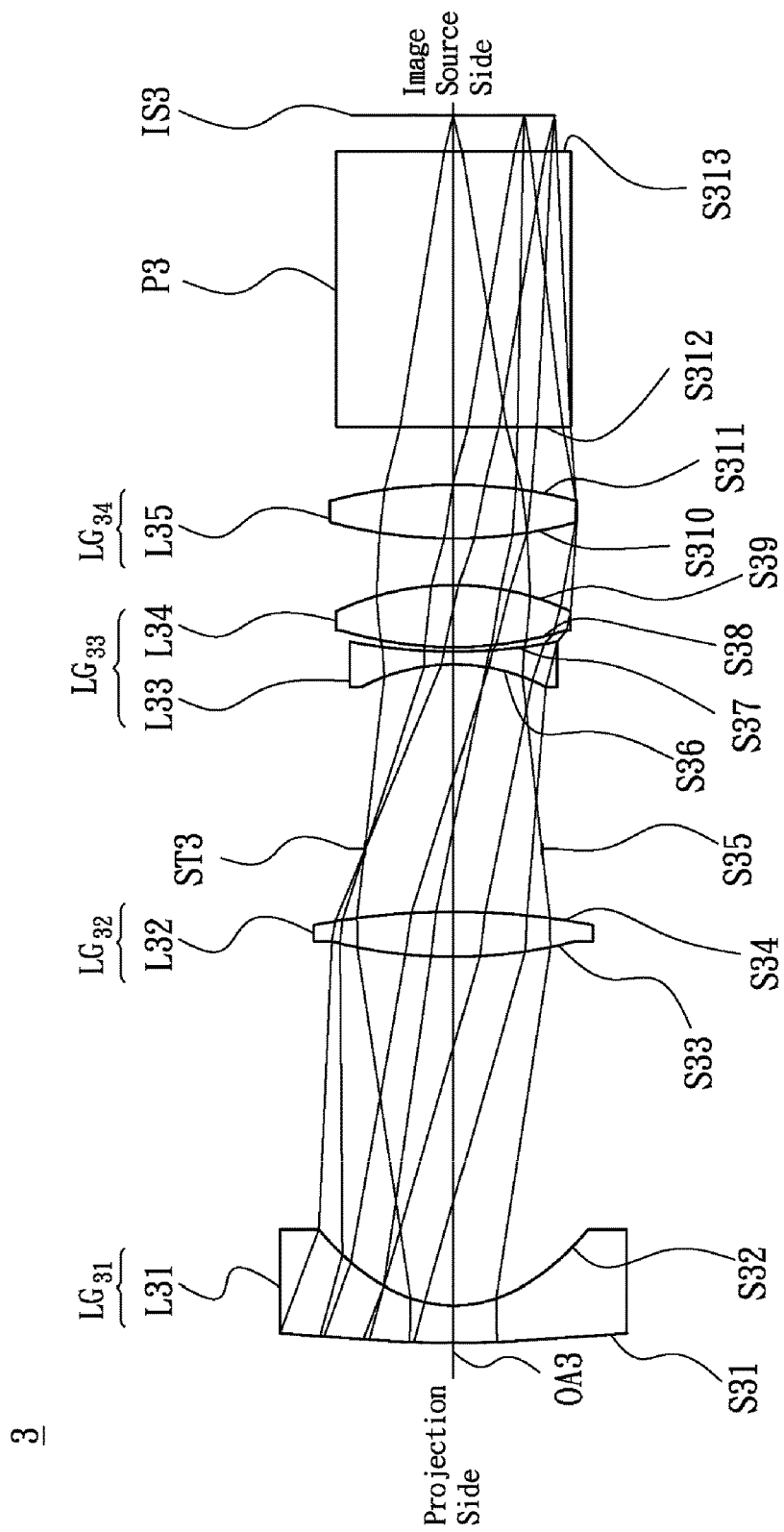
FIG. 5 is a lens layout and optical path diagram of a projection lens assembly in accordance with a third embodiment of the invention.

Referring to FIG. 5, FIG. 5 is a lens layout and optical path diagram of a projection lens assembly in accordance with a third embodiment of the invention. The projection lens assembly 3 includes a first lens group $LG_{31}$, a second lens group $LG_{32}$, a stop ST3, a third lens group $LG_{33}$, a fourth lens group $LG_{34}$ and a prism P3, all of which are arranged in order from a projection side to an image source side along an optical axis OA3. In operation, light rays from an image source IS3 are projected on the projection side. The effective focal length of the projection lens assembly 3 can be adjusted by changing group intervals among the first lens group $LG_{31}$, the second lens group $LG_{32}$, the third lens group $LG_{33}$ and the fourth lens group $LG_{34}$ along the optical axis OA3 such that the projection lens assembly 3 has a zoom function. The first lens group $LG_{31}$ is with negative refractive power and includes a first lens L31, wherein the first lens L31 is a meniscus lens with negative refractive power, made of glass material, and the projection side surface S31 is a convex surface, the image source side surface S32 is a concave surface and both of the projection side surface S31 and image source side surface S32 are aspheric surfaces. The second lens group $LG_{32}$ is with positive refractive power and includes a second lens L32, wherein the second lens L32 is a biconvex lens with positive refractive power, made of glass material, and the projection side surface S33 is a convex surface, the image source side surface S34 is a convex surface and both of the projection side surface S33 and image source side surface S34 are spherical surfaces. The third lens group $LG_{33}$ is with negative refractive power and includes a third lens L33 and a fourth lens L34, wherein the third lens L33 is a biconcave lens with negative refractive power, made of glass material, the projection side surface S36 is a concave surface, the image source side surface S37 is a concave surface and both of the projection side surface S36 and image source side surface S37 are spherical surfaces, the fourth lens L34 is a biconvex lens with positive refractive power, made of glass material, the projection side surface S38 is a convex surface, the image source side surface S39 is a convex surface and both of the projection side surface S38 and image source side surface S39 are spherical surfaces. The fourth lens group $LG_{34}$ is with positive refractive power and includes a fifth lens L35, wherein the fifth lens L35 is a biconvex lens with positive refractive power, made of glass material, and the projection side surface S310 is a convex surface, the image source side surface S311 is a convex surface and both of the projection side surface S310 and image source side surface S311 are aspheric surfaces. Both of the projection side surface S312 and image source side surface S313 of the prism P3 are plane surfaces.

In order to maintain excellent optical performance of the projection lens assembly in accordance with the third embodiment of the invention, the projection lens assembly 3 satisfies the following seven conditions:

$$1.4 < F3 < 3.5 \quad (15)$$

$$f_T/f_W > 1 \quad (16)$$

$$Vd3_1 > 40 \quad (17)$$

$$Nd3_2 > 1.6 \quad (18)$$

$$Nd3_3 > 1.6 \quad (19)$$

$$Nd3_4 > 1.6 \quad (20)$$

$$Vd3_3 < 35 \quad (21)$$

wherein F3 is an F-number of the projection lens assembly 3, $f_T$ is an effective focal length of the projection lens assembly 3 at a telephoto end, $f_W$ is an effective focal length of the projection lens assembly 3 at a wide-angle end, $Vd3_1$ is an Abbe number of the first lens L31, $Nd3_2$ is an index of refraction of the second lens L32, $Nd3_3$ is an index of refraction of the third lens L33, $Nd3_4$ is an index of refraction of the fourth lens L34 and $Vd3_3$ is an Abbe number of the third lens L33.

By the above design of the lenses and stop ST3, the projection lens assembly 3 is provided with an effective reduced volume, a decreased F-number, an effective corrected aberration, an increased resolution and a decreased effect of temperature change on image quality.

In order to achieve the above purposes and effectively enhance the optical performance, the projection lens assembly 3 in accordance with the third embodiment of the invention is provided with the optical specifications shown in Table 5, which include the effective focal length, F-number, curvature of each lens surface, thickness between adjacent surface, refractive index of each lens and Abbe number of each lens. Table 5 shows that the effective focal length at wide-angle end is equal to 16.1 mm, the effective focal length at telephoto end is equal to 17 mm, and F-number is equal to 2.0 for the projection lens assembly 3 of the third embodiment of the invention.

TABLE 5

Effective Focal Length at Wide-angle End = 16.1 mm
Effective Focal Length at Wide-angle End = 17 mm
F-number = 2.0

| Surface Number | Curvature (mm$^{-1}$) | Thickness (mm) | Nd | Vd | Remark |
|---|---|---|---|---|---|
| S31 | 0.012 | 3.5 | 1.48 | 70 | The First Lens L31 |
| S32 | 0.086 | 34.1 | | | |
| | | (Wide-angle End) | | | |
| | | 32.7 | | | |
| | | (Telephoto End) | | | |
| S33 | 0.021 | 4.2 | 1.8 | 46 | The Second Lens L32 |
| S34 | −0.014 | 5.9 | | | |
| S35 | 0 | 14.9 | | | Stop ST3 |
| | | (Wide-angle End) | | | |
| | | 17.3 | | | |
| | | (Telephoto End) | | | |
| S36 | −0.053 | 1.2 | 1.77 | 26 | The Third Lens L33 |
| S37 | 0.019 | 0.45 | | | |
| S38 | 0.027 | 5.8 | 1.67 | 55 | The Fourth Lens L34 |
| S39 | −0.038 | 4.9 | | | |
| | | (Wide-angle End) | | | |
| | | 4.3 | | | |
| | | (Telephoto End) | | | |
| S310 | 0.025 | 5.1 | 1.56 | 59 | The Fifth Lens L35 |
| S311 | −0.027 | 5.4 | | | |
| S312 | 0 | 25.7 | 1.51 | 64 | Prism P3 |
| S313 | 0 | 3.4 | | | |

The aspheric surface sag z of each lens in table 5 can be calculated by the following formula:

$$z = ch^2 / \{1 + [1 - (k+1)c^2h^2]^{1/2}\} + Ah^4 + Bh^6 + Ch^8 + Dh^{10} + Eh^{12} + Fh^{14} + Gh^{16}$$

where c is curvature, h is the vertical distance from the lens surface to the optical axis, k is conic constant and A, B, C, D, E, F and G are aspheric coefficients.

In the third embodiment, the conic constant k and the aspheric coefficients A, B, C, D, E, F, G of each surface are shown in Table 6.

TABLE 6

| | Surface Number | | | |
|---|---|---|---|---|
| | S31 | S32 | S310 | S311 |
| k | −101 | −0.82 | −2.37 | −7.55 |
| A | −8.945e−006 | −2.754e−005 | 3.046e−006 | 4.634e−006 |
| B | 6.193e−008 | 1.946e−007 | −1.147e−007 | −5.078e−008 |
| C | −1.331e−010 | −2.736e−010 | 1.244e−009 | 1.026e−009 |
| D | −2.843e−013 | 7.107e−013 | −5.685e−012 | −4.552e−012 |
| E | 1.044e−015 | −3.046e−014 | 0 | 0 |
| F | 1.179e−018 | 1.617e−016 | 0 | 0 |
| G | −4.317e−021 | −2.150e−019 | 0 | 0 |

For the projection lens assembly 3 of the third embodiment, the F-number F3 of the projection lens assembly 3 is equal to 2.0, the effective focal length $f_T$ of the projection lens assembly 3 at telephoto end is equal to 17 mm, the effective focal length $f_W$ of the projection lens assembly 3 at wide-angle end is equal to 16.1 mm, the Abbe number $Vd3_1$ of the first lens L31 is equal to 70, the index of refraction $Nd3_2$ of the second lens L32 is equal to 1.8, the index of refraction $Nd3_3$ of the third lens L33 is equal to 1.77, the index of refraction $Nd3_4$ of the fourth lens L34 is equal to 1.67 and the Abbe number $Vd3_3$ of the third lens L33 is equal to 26. According to the above data, the following values can be obtained:

$F3=2.0$, $f_T/f_W=1.06$, $Vd3_1=70$, $Nd3_2=1.8$, $Nd3_3=1.77$, $Nd3_4=1.67$, $Vd3_3=26$ which respectively satisfy the above conditions (15)-(21).

Figure 6A:
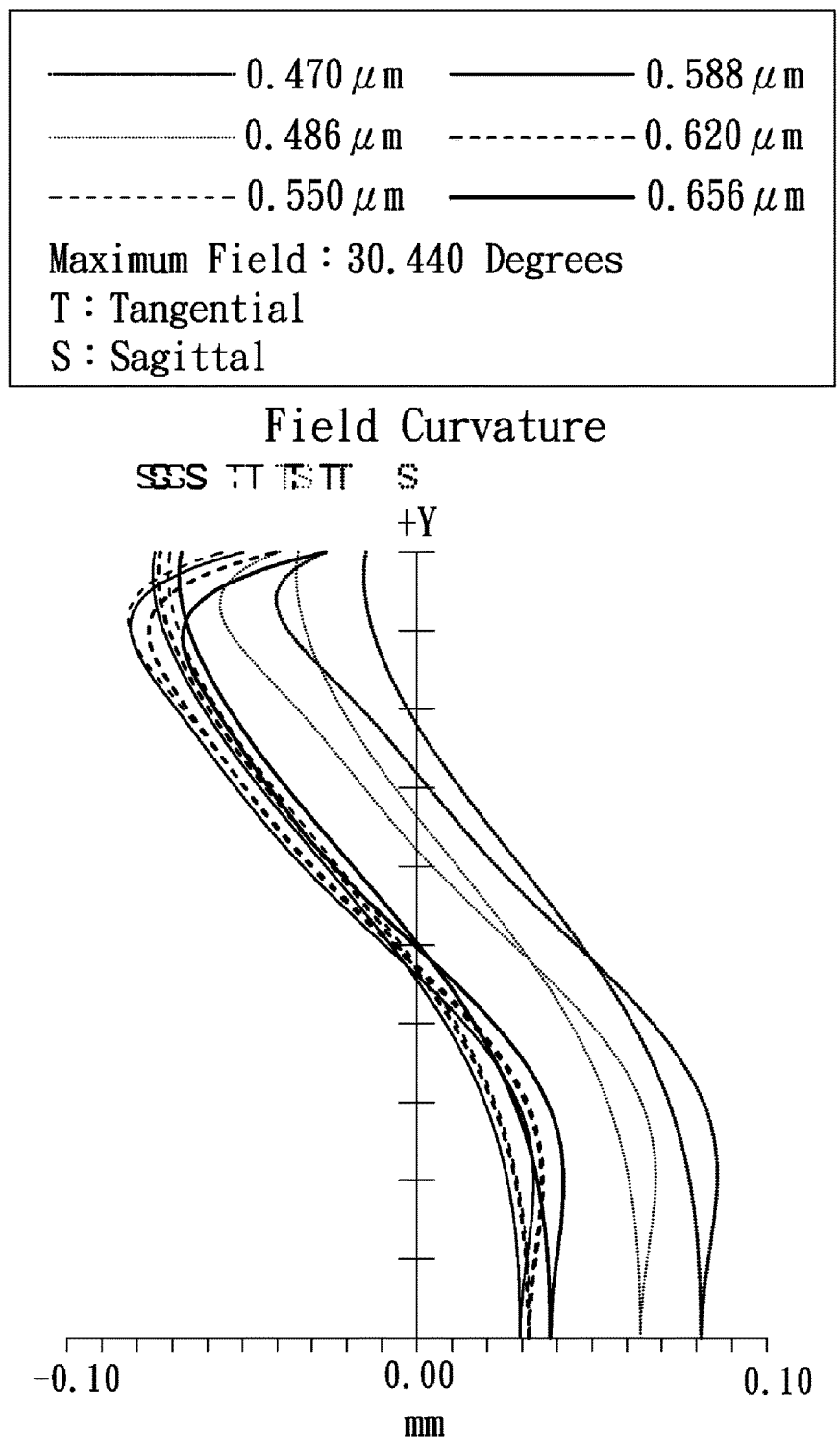
FIG. 6A depicts a field curvature diagram of the projection lens assembly at wide-angle end in accordance with the third embodiment of the invention.
Figure 6B:
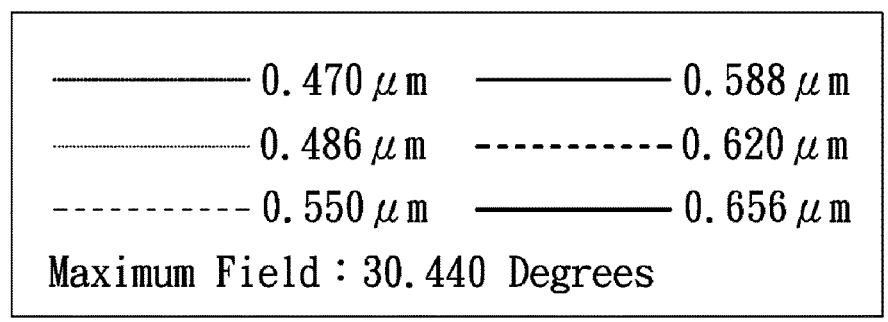
FIG. 6B is a distortion diagram of the projection lens assembly at wide-angle end in accordance with the third embodiment of the invention.
Figure 6B:
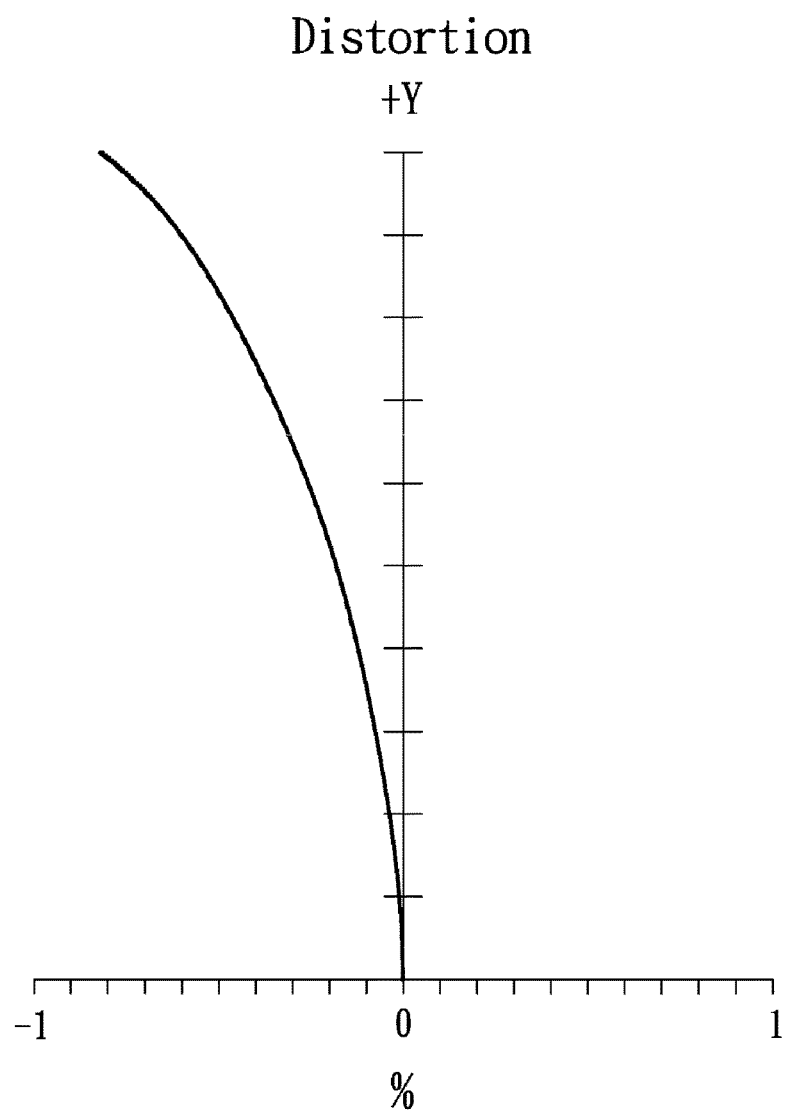
Figure 6C:
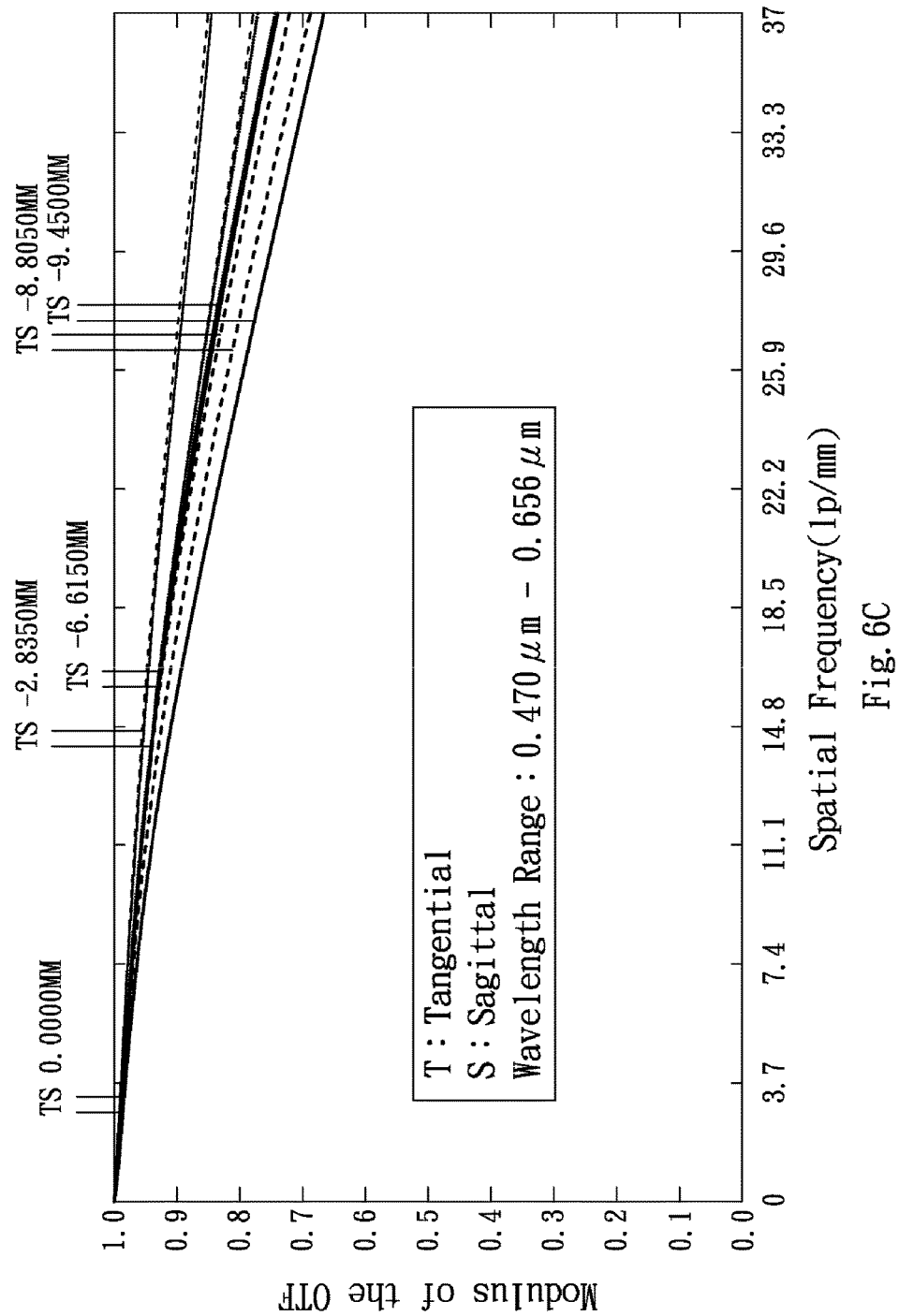
FIG. 6C is a modulation transfer function diagram of the projection lens assembly at wide-angle end in accordance with the third embodiment of the invention.
Figure 6D:
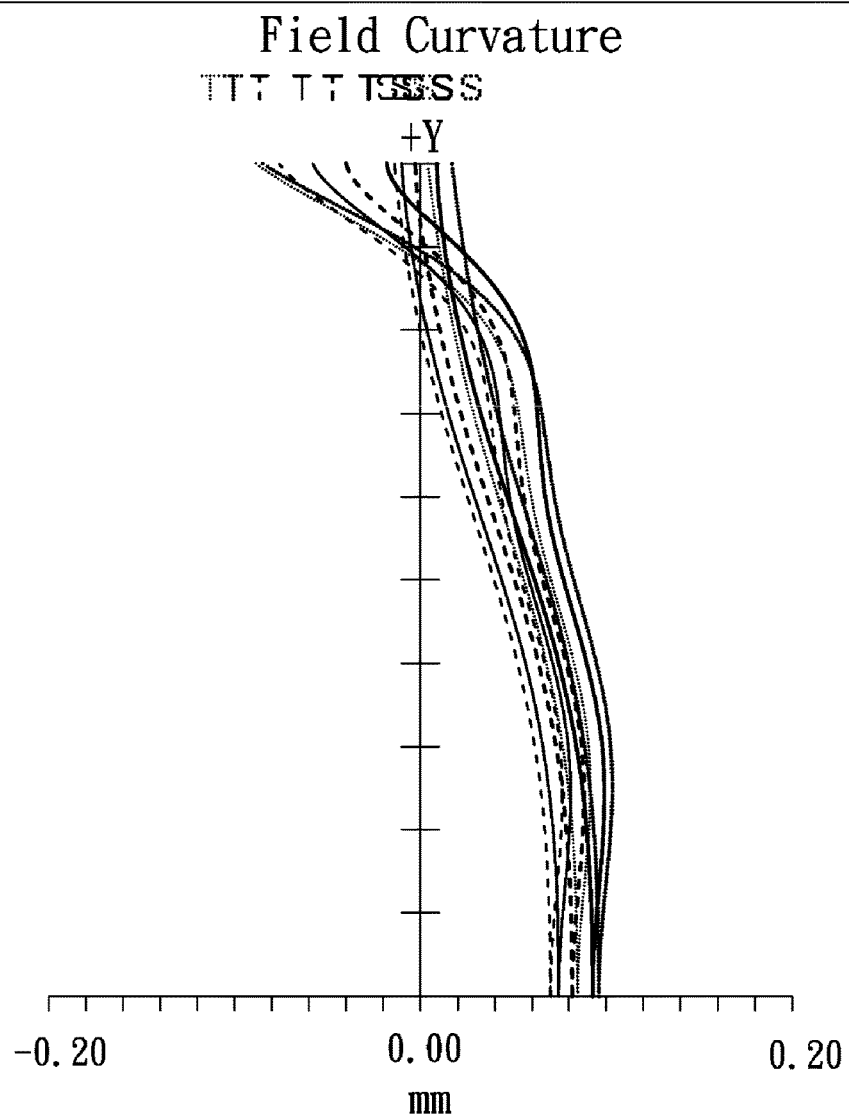
FIG. 6D is a field curvature diagram of the projection lens assembly at telephoto end in accordance with the third embodiment of the invention.
Figure 6E:
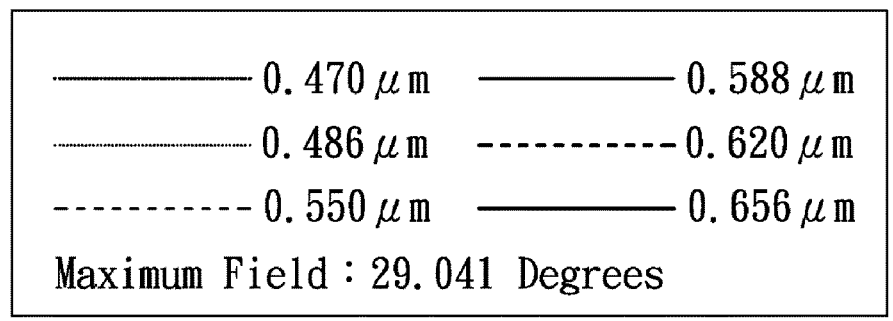
FIG. 6E is a distortion diagram of the projection lens assembly at telephoto end in accordance with the third embodiment of the invention.
Figure 6E:
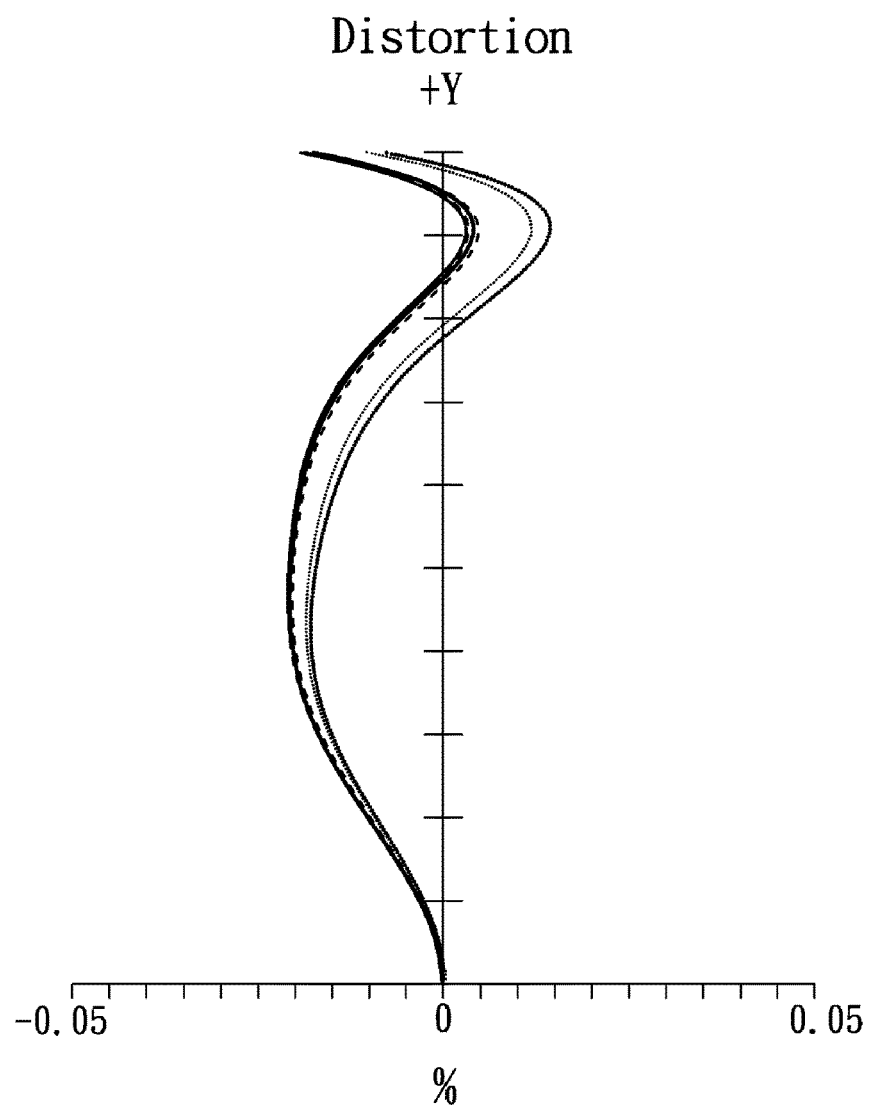
Figure 6F:
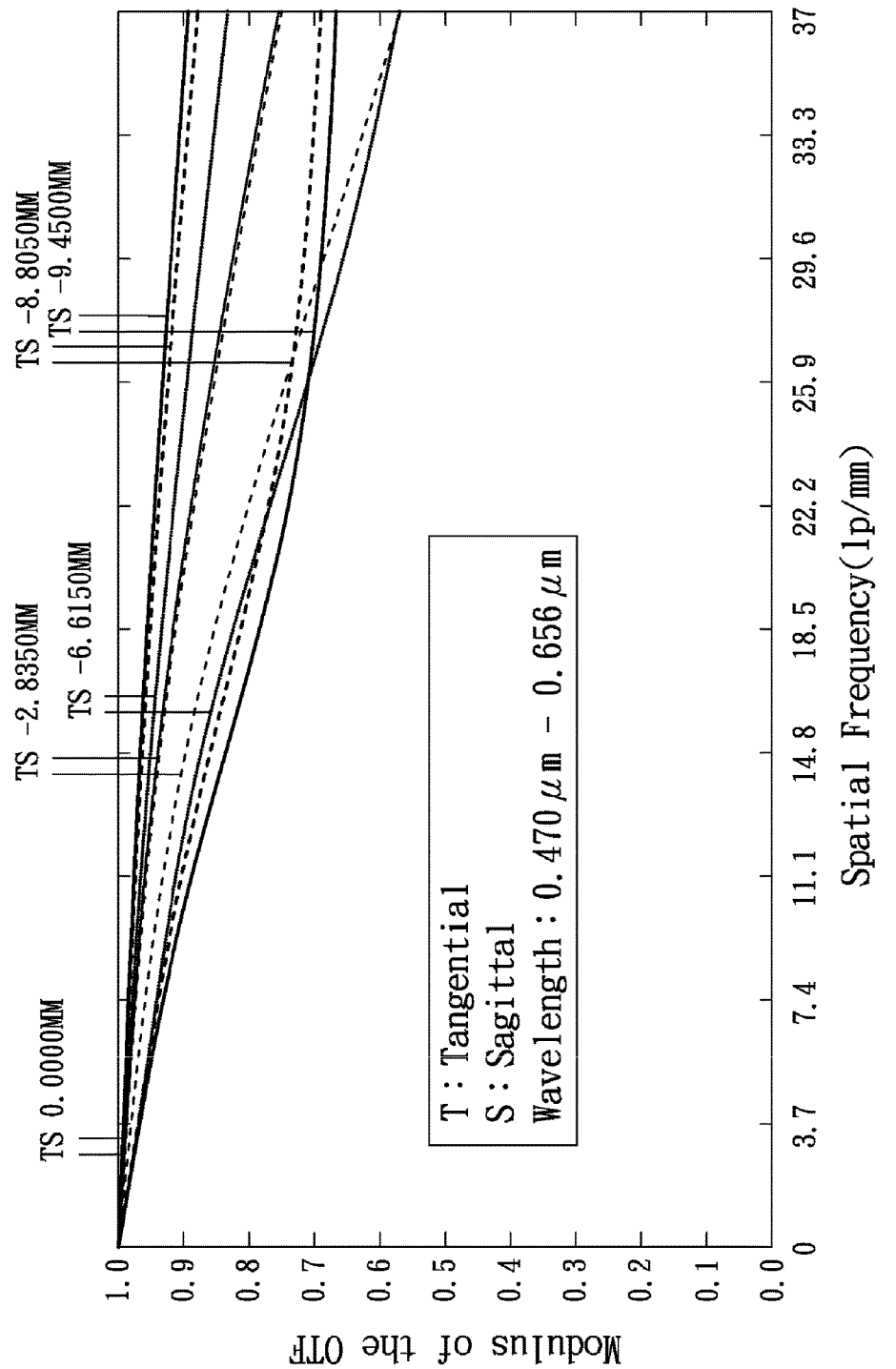
FIG. 6F is a modulation transfer function diagram of the projection lens assembly at telephoto end in accordance with the third embodiment of the invention.

By the above arrangements of the lenses and stop ST3, the projection lens assembly 3 of the third embodiment can meet the requirements of optical performance as seen in FIGS. 6A-6F, wherein FIG. 6A shows a field curvature diagram of the projection lens assembly 3 at wide-angle end in accordance with the third embodiment of the invention, FIG. 6B shows a distortion diagram of the projection lens assembly 3 at wide-angle end in accordance with the third embodiment of the invention, FIG. 6C shows a modulation transfer function diagram of the projection lens assembly 3 at wide-angle end in accordance with the third embodiment of the invention, FIG. 6D shows a field curvature diagram of the projection lens assembly 3 at telephoto end in accordance with the third embodiment of the invention, FIG. 6E shows a distortion diagram of the projection lens assembly 3 at telephoto end in accordance with the third embodiment of the invention and FIG. 6F shows a modulation transfer function diagram of the projection lens assembly 3 at telephoto end in accordance with the third embodiment of the invention.

It can be seen from FIG. 6A that the field curvature of tangential direction and sagittal direction in the projection lens assembly 3 of the third embodiment at wide-angle end ranges from −0.09 mm to 0.09 mm for the wavelength of 0.470 μm, 0.486 μm, 0.550 μm, 0.588 μm, 0.620 μm and 0.656 μm. It can be seen from FIG. 6B (in which the six lines in the figure almost coincide to appear as if a signal line) that the distortion in the projection lens assembly 3 of the third embodiment at wide-angle end ranges from −0.8% to 0% for the wavelength of 0.470 μm, 0.486 μm, 0.550 μm, 0.588 μm, 0.620 μm and 0.656 μm. It can be seen from FIG. 6C that the modulation transfer function of tangential direction and sagittal direction in the projection lens assembly 3 of the third embodiment at wide-angle end ranges from 0.67 to 1.0 wherein the wavelength ranges from 0.470 μm to 0.656 μm, the fields respectively are 0.0000 mm, −2.8350 mm, −6.6150 mm, −8.8050 mm and −9.4500 mm, and the spatial frequency ranges from 0 lp/mm to 37 lp/mm. It can be seen from FIG. 6D that the field curvature of tangential direction and sagittal direction in the projection lens assembly 3 of the third embodiment at telephoto end ranges from −0.09 mm to 0.11 mm for the wavelength of 0.470 μm, 0.486 μm, 0.550 μm, 0.588 μm, 0.620 μm and 0.656 μm. It can be seen from FIG. 6E (in which the six lines in the figure almost coincide to appear as if a signal line) that the distortion in the projection lens assembly 3 of the third embodiment at telephoto end ranges from −0.025% to 0.015% for the wavelength of 0.470 μm, 0.486 μm, 0.550 μm, 0.588 μm, 0.620 μm and 0.656 μm. It can be seen from FIG. 6F that the modulation transfer function of tangential direction and sagittal direction in the projection lens assembly 3 of the third embodiment at telephoto end ranges from 0.57 to 1.0 wherein the wavelength ranges from 0.470 μm to 0.656 μm, the fields respectively are 0.0000 mm, −2.8350 mm, −6.6150 mm, −8.8050 mm and −9.4500 mm, and the spatial frequency ranges from 0 lp/mm to 37 lp/mm. It is obvious that the field curvature and the distortion of the projection lens assembly 3 of the third embodiment can be corrected effectively, and the resolution of the projection lens assembly 3 of the third embodiment can meet the requirements. Therefore, the projection lens assembly 3 of the third embodiment is capable of good optical performance.

The conditions $1.4<F3<3.5$ and $f_T/f_W>1$ are basic requirements for the present invention. The numerical values of the embodiments of the present invention also fall within the scope of the remaining conditions. The condition $1.4<F3<3.5$ limits the luminous flux of the projection lens assembly, the smaller the value the greater the luminous flux, and more preferable condition is $1.4<F3<2.5$. The condition $f_T/f_W>1$ means that the projection lens assembly is with zoom function, and more preferable condition is $1.08>f_T/f_W>1$. The conditions $Vd3_1>40$, $Nd3_2>1.6$, $Nd3_3>1.6$, $Vd3_3<35$ and $Nd3_4>1.6$ restrict the material type of the first, second, third and fourth lens respectively. More preferable conditions are $71>Vd3_1>40$, $1.9>Nd3_2>1.6$, $1.78>Nd3_3>1.6$, $25<Vd3_3<35$ and $1.68>Nd3_4>1.6$.

What is claimed is:

1. A projection lens assembly comprising:
a first lens group which is with negative refractive power;
a second lens group which is with positive refractive power and comprises a projection side surface and an image source side surface, wherein both of the projection side surface and the image source side surface are convex surfaces;
a third lens group which comprises a third lens and a fourth lens, the third and fourth lenses being arranged in order from a projection side to an image source side along an optical axis, and the fourth lens comprising a convex surface facing the projection side; and
a fourth lens group which is with positive refractive power and comprises a convex surface facing the image source side;
wherein the first lens group, the second lens group, the third lens group and the fourth lens group are arranged in order from the projection side to the image source side along the optical axis;

wherein lens group intervals among the first lens group, the second lens group, the third lens group, and the fourth lens group along the optical axis are adjustable to change an effective focal length of the projection lens assembly;

wherein the projection lens assembly satisfies:

$1.4<F<3.5$, $Vd_3<35$, wherein F is an F-number of the projection lens assembly and $Vd_3$ is an Abbe number of the third lens.

2. The projection lens assembly as claimed in claim 1, wherein the first lens group comprises a first lens with negative refractive power, the second lens group comprises a second lens with positive refractive power, the third lens is with negative refractive power and the fourth lens is with positive refractive power, and the fourth lens group comprises a fifth lens with positive refractive power.

3. The projection lens assembly as claimed in claim 2, wherein the projection lens assembly satisfies:

$0.6<R_{12}/f<1.5$, wherein $R_{12}$ is a radius of curvature of an image source side surface of the first lens and f is an effective focal length of the projection lens assembly.

4. The projection lens assembly as claimed in claim 3, wherein the projection lens assembly satisfies:

$0.6<R_{12}/f<1.2$, $71>Vd_1>40$, $1.9>Nd_2>1.6$, $1.78>Nd_3>1.6$, $25<Vd_3<35$, $1.68>Nd_4>1.6$, wherein $R_{12}$ is a radius of curvature of an image source side surface of the first lens, f is an effective focal length of the projection lens assembly, $Vd_1$ is an Abbe number of the first lens, $Nd_2$ is an index of refraction of the second lens, $Nd_3$ is an index of refraction of the third lens, $Vd_3$ is an Abbe number of the third lens and $Nd_4$ is an index of refraction of the fourth lens.

5. The projection lens assembly as claimed in claim 2, wherein the first lens is an aspheric lens and satisfies:

$Vd_1>40$, wherein $Vd_1$ is an Abbe number of the first lens.

6. The projection lens assembly as claimed in claim 2, wherein the fifth lens is an aspheric lens.

7. The projection lens assembly as claimed in claim 2, wherein the second lens is a spherical lens, and satisfies:

$Nd_2>1.6$, wherein $Nd_2$ is an index of refraction of the second lens.

8. The projection lens assembly as claimed in claim 2, wherein the third lens is a spherical lens, and satisfies:

$Nd_3>1.6$, wherein $Nd_3$ is an index of refraction of the third lens.

9. The projection lens assembly as claimed in claim 2, wherein the fourth lens is a spherical lens, and satisfies:

$Nd_4>1.6$ wherein $Nd_4$ is an index of refraction of the fourth lens.

10. The projection lens assembly as claimed in claim 2, wherein the third lens is a spherical lens.

11. The projection lens assembly as claimed in claim 2, further comprising a stop disposed between the second lens and the fourth lens, wherein the third lens and the fourth lens are cemented together to form a cemented lens.

12. The projection lens assembly as claimed in claim 1, wherein the projection lens assembly satisfies:

$1.4<F<2.5$, wherein F is an F-number of the projection lens assembly.

13. The projection lens assembly as claimed in claim 1, wherein the first lens group comprises a first lens with negative refractive power, the second lens group comprises a second lens with positive refractive power, the third lens group is with negative refractive power, and the fourth lens group comprises a fifth lens with positive refractive power.

14. The projection lens assembly as claimed in claim 13, wherein the projection lens assembly satisfies:

$f_T/f_W>1$, wherein $f_T$ is an effective focal length of the projection lens assembly at a telephoto end and $f_W$ is an effective focal length of the projection lens assembly at a wide-angle end.

15. The projection lens assembly as claimed in claim 13, wherein the second lens is a spherical lens, and satisfies:

$Nd_2>1.6$, wherein $Nd_2$ is an index of refraction of the second lens.

16. The projection lens assembly as claimed in claim 13, wherein the third lens is a spherical lens, and satisfies:

$Nd_3>1.6$, wherein $Nd_3$ is an index of refraction of the third lens.

17. The projection lens assembly as claimed in claim 13, wherein the fourth lens is a spherical lens, and satisfies:

$Nd_4>1.6$, wherein $Nd_4$ is an index of refraction of the fourth lens.

18. The projection lens assembly as claimed in claim 13, wherein the first lens is an aspheric lens, and satisfies:

$Vd_1>40$, wherein $Vd_1$ is an Abbe number of the first lens.

19. The projection lens assembly as claimed in claim 13, wherein the third lens is a spherical lens.

20. A projection lens assembly comprising:
a first lens group which is with negative refractive power;
a second lens group which is with positive refractive power and comprises a projection side surface and an image source side surface, wherein both of the projection side surface and the image source side surface are convex surfaces;
a third lens group which comprises a third lens and a fourth lens, the third and fourth lenses being arranged in order from a projection side to an image source side along an optical axis, and the fourth lens comprising a convex surface facing the projection side; and
a fourth lens group which is with positive refractive power and comprises a convex surface facing the image source side;
wherein the first lens group, the second lens group, the third lens group and the fourth lens group are arranged in order from the projection side to the image source side along the optical axis;

wherein lens group intervals among the first lens group, the second lens group, the third lens group, and the fourth lens group along the optical axis are adjustable to change an effective focal length of the projection lens assembly;
wherein the projection lens assembly satisfies:

$$1.4 < F < 3.5,$$

$$Nd_4 > 1.6,$$

wherein F is an F-number of the projection lens assembly and $Nd_4$ is an index of refraction of the fourth lens.

* * * * *